US012675599B2

(12) United States Patent (10) Patent No.: US 12,675,599 B2
Jin et al. (45) Date of Patent: Jul. 7, 2026

(54) METHOD AND SYSTEM FOR PRIVACY-PRESERVING LOGISTIC REGRESSION TRAINING BASED ON HOMOMORPHICALLY ENCRYPTED CIPHERTEXTS

(71) Applicant: AGENCY FOR SCIENCE, TECHNOLOGY AND RESEARCH, Singapore (SG)

(72) Inventors: Chao Jin, Singapore (SG); Fook Mun Chan, Singapore (SG); Khin Mi Mi Aung, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 458 days.

(21) Appl. No.: 18/260,776

(22) PCT Filed: Jan. 8, 2021

(86) PCT No.: PCT/SG2021/050015
§ 371 (c)(1),
(2) Date: Jul. 7, 2023

(87) PCT Pub. No.: WO2022/150010
PCT Pub. Date: Jul. 14, 2022

(65) Prior Publication Data
US 2024/0061955 A1 Feb. 22, 2024

(51) Int. Cl.
*G06N 3/084* (2023.01)
*G06F 21/62* (2013.01)
*H04L 9/00* (2022.01)

(52) U.S. Cl.
CPC .......... *G06F 21/6245* (2013.01); *H04L 9/008* (2013.01)

(58) Field of Classification Search
CPC ...................................................... G06N 3/084
See application file for complete search history.

(56) References Cited

FOREIGN PATENT DOCUMENTS

CN 111291781 A 6/2020

OTHER PUBLICATIONS

Extended European Search Report issued Sep. 6, 2024 regarding Application No. 21917979.3, 7 pages.
Froelicher et al., "Scalable Privacy-Preserving Distributed Learning", arXiv:2005.09532v3, Jan. 2021, 21 pages.
(Continued)

*Primary Examiner* — Y Lee

(57) ABSTRACT

There is provided a method of privacy-preserving logistic regression training based on homomorphically encrypted ciphertexts. The method includes: obtaining a first packed ciphertext comprising at least a portion of a first training data sample packed into a first vector of slots thereof for training a privacy-preserving logistic regression model; obtaining a second packed ciphertext comprising a plurality of weights of the privacy-preserving logistic regression model packed into a first vector of slots thereof; determining at least a first output probability of the privacy-preserving logistic regression model based on the first packed ciphertext and the second packed ciphertext; and updating the plurality of weights based on the first output probability. There is also provided a corresponding system for privacy-preserving logistic regression training based on homomorphically encrypted data.

20 Claims, 10 Drawing Sheets

(56) References Cited

OTHER PUBLICATIONS

Nandakumar et al., "Towards Deep Neural Network Training on Encrypted Data", 2019 IEEE/CVF Conference on Computer Vision and Pattern Recognition Workshops (CVPRW), Jun. 2019, 9 pages.

Han et al., "Efficient Privacy Preserving Logistic Regression Inference and Training", IACR Cryptology ePrint Archive, Nov. 2020, 29 pages.

Imabayashi et al., "Secure Frequent Pattern Mining by Fully Homomorphic Encryption with Ciphertext Packing", Proceedings of 11th International Workshop, DPM 2016 and 5th International Workshop, QASA 2016, Lecture Notes in Computer Science, vol. 9963, Sep. 2016, 16 pages.

Badawi et al., "PrivFT: Private and Fast Text Classification with Homomorphic Encryption", arXiv:1908.06972v2, Nov. 2019, 16 pages.

Kocabaş et al., "Towards Privacy-Preserving Medical Cloud Computing Using Homomorphic Encryption", Virtual and Mobile Healthcare: Breakthroughs in Research and Practice, Jan. 2020, 30 pages.

Halevi et al., "Algorithms in HElib", Advances in Cryptology—CRYPTO 2014, Lecture Notes in Computer Science, vol. 8616, Aug. 2014, 20 pages.

Juvekar et al., "Gazelle: A Low Latency Framework for Secure Neural Network Inference", arXiv:1801.05507v1, Jan. 2018, 17 pages.

Jiang et al., "Secure Outsourced Matrix Computation and Application to Neural Networks", Proceedings of the 2018 ACM SIGSAC Conference on Computer and Communications Security (CCS '18), Oct. 2018, 23 pages.

Gentry et al., "Fully Homomorphic Encryption with Polylog Overhead", Advances in Cryptology—EUROCRYPT 2012, Lecture Notes in Computer Science, vol. 7237, Apr. 2012, 40 pages.

International Search Report and Written Opinion issued Apr. 14, 2021 regarding International Application No. PCT/SG2021/050015, 8 pages.

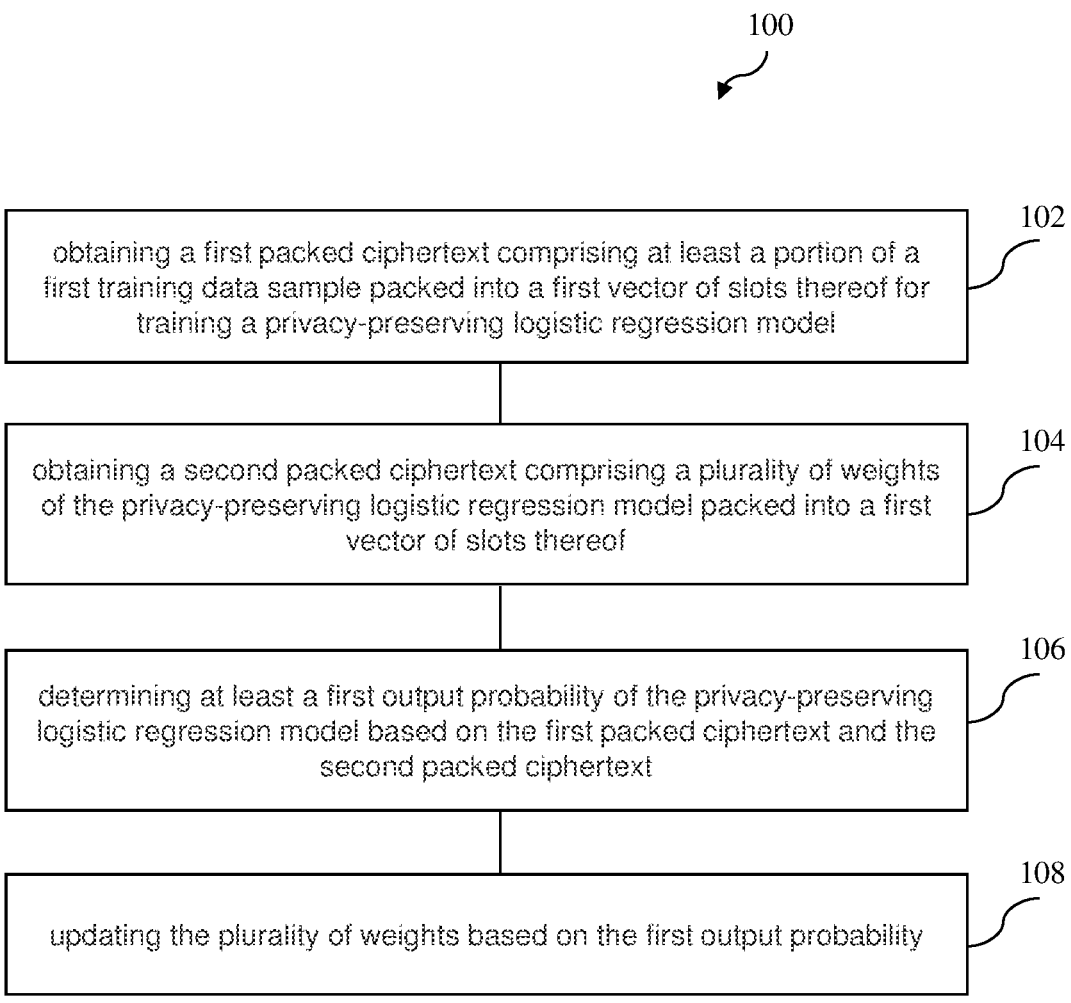

100 obtaining a first packed ciphertext comprising at least a portion of a first training data sample packed into a first vector of slots thereof for training a privacy-preserving logistic regression model

102 obtaining a second packed ciphertext comprising a plurality of weights of the privacy-preserving logistic regression model packed into a first vector of slots thereof

104 determining at least a first output probability of the privacy-preserving logistic regression model based on the first packed ciphertext and the second packed ciphertext

106 updating the plurality of weights based on the first output probability

METHOD AND SYSTEM FOR PRIVACY-PRESERVING LOGISTIC REGRESSION TRAINING BASED ON HOMOMORPHICALLY ENCRYPTED CIPHERTEXTS

CROSS-REFERENCE TO RELATED APPLICATION

This application is a 371 National Stage of International Application No. PCT/SG2021/050015, filed on 8 Jan. 2021, the content of which being hereby incorporated by reference in its entirety for all purposes.

TECHNICAL FIELD

The present invention generally relates to a method of privacy-preserving logistic regression training based on homomorphically encrypted ciphertexts, and a system thereof.

BACKGROUND

Data privacy is becoming an increasingly important issue in the hot data science industry. Homomorphic encryption (HE) enables computation directly on encrypted data (which may interchangeably be referred to herein as ciphertext), and ensures the privacy of data when applied with machine learning systems (e.g., deep learning systems). In particular, logistic regression is a popular technique used in machine learning to construct classification models. For example, as the construction of such classification models is based on computation with large datasets (e.g., training data samples, which may also be simply referred to as training samples), such computation may be outsourced to a server (e.g., cloud server). However, such training data samples may be sensitive and thus, the training data samples may be encrypted, and in particular, homomorphically encrypted prior to being outsourced to preserve privacy. Accordingly, homomorphic encryption enables computation directly on encrypted data, without decryption and may thus be used to mitigate privacy concerns. Accordingly, a method of privacy-preserving logistic regression training based on homomorphically encrypted data (which may interchangeably be referred to herein as homomorphically encrypted (HE) ciphertext) may be provided. For example, this may be extremely useful in the environment of an untrusted third-party computation server, where the server only sees the encrypted data and/or model even though it may perform all the learning and inference computations.

One of the core operations of machine learning models, and in particular, a logistic regression model, is the matrix-vector multiplication. For example, when creating HE encrypted models (e.g., machine learning models having inputs thereto and/or weights thereof homomorphically encrypted, that is, in the form of HE ciphertexts), it may be necessary to translate the matrix-vector multiplications from the plaintext domain into the encrypted domain. For example, a conventional method may encrypt the data points in the matrix or vector separately, in which each data point is a separate ciphertext, and the matrix-vector multiplication process follows the usual way as in the plaintext domain. However, such a conventional method has a number of major drawbacks. Firstly, the number of ciphertexts created in the process is very large. In this regard, when a data point is encrypted into a ciphertext, its size may increase by, for example, thousands to millions of times. As a result, the computation process may potentially take up a huge amount of server memory and storage resources when the matrix and vector dimension sizes are large. Secondly, the conventional method may not be able to take advantage of the parallel computation (which may also be known as Single-Instruction-Multiple-Data (SIMD)) offered by modern HE packing techniques or schemes.

Modern HE schemes can support packed encryption, in which the ciphertext structure is configured as a vector of slots, whereby each slot encrypts a different plaintext data point. Therefore, packing enables reductions in the number of ciphertexts required for a given set of data points. On the other hand, it also enables parallel or vectorized execution of the homomorphic operations between ciphertexts, as per the SIMD execution model. For example, when adding (resp. multiplying) two packed ciphertexts, it is equivalent to concurrent slot-wise addition (resp. multiplication) of the underlying vectors of the two ciphertexts. Moreover, HE schemes also provide mechanisms to rotate the underlying plaintext vectors (i.e., circular shifting of the slots) inside the ciphertexts to enable inter-slot interaction. For instance, to add two numbers in misaligned slots in two ciphertexts, it may be necessary to rotate one ciphertext to align the corresponding slots followed by slot-wise addition.

Various conventional methods have been proposed to utilize the powerful features of HE packing to facilitate matrix-vector multiplications in the HE domain. However, they suffer from various limitations. For example, they may either assume the matrices to be square, or the row/column vector dimension size to be power-of-two. Although zero padding may be used to make non-square matrices become square, and non-power-of-two sized vectors become power-of-two size, this may result in wasting a large number of slot spaces, as well as imposing a large number of unnecessary computations.

For example, a naïve method to perform a homomorphic matrix-vector multiplication may be to pack each row of the operand matrix into a separate ciphertext, and the operand column vector into another ciphertext. Subsequently, it computes the dot product between each row-ciphertext and the column-ciphertext. However, in such a naïve method, the matrix is not fully compactly packed, that is, it still needs to create multiple ciphertexts as many as the number of rows in the matrix. It also requires the row/column vector size to be power-of-two, in order to enable efficient summation of the slots during dot-product computation.

For example, the diagonal method proposed by Halevi and Shoup (e.g., see Shai Halevi and Victor Shoup, Algorithms in HElib, "In Advances in Cryptology—CRYPTO 2014", 34th Annual Cryptology Conference, Santa Barbara, CA, USA, Aug. 17-21, 2014, Proceedings, Part I, pages 554-571, 2014) packs diagonals instead of rows of the matrix into separate ciphertexts, and by doing so, it eliminates the inter-slot summations when computing the dot product of each row vector and the column vector. However, it requires multiple rotations of the column vector within a short range which subsequently need more complicated masking and rotation operations. Moreover, it requires the operand matrix to be square matrix, and the matrix is also not fully compactly packed, similar to the above-mentioned naïve method.

For example, Gazelle (e.g., see Juvekar, C., Vaikuntanathan, V., and Chandrakasan, A., "GAZELLE: A low latency framework for secure neural network inference", In 27th USENIX Security Symposium (USENIX Security 18), pp. 1651-1669, USENIX Association, 2018) proposed a hybrid method which is the combination of the diagonal method and the above-mentioned naïve method. Although it does not require the operand matrix to be square, it still needs to create multiple ciphertexts to pack the matrix, and the operand column vector still needs to be rotated within a short range as in the diagonal method.

For example, E2DM (e.g., see Jiang, X., Kim, M., Lauter, K., and Song, Y., "Secure outsourced matrix computation and application to neural networks", In Proceedings of the 2018 ACM SIGSAC Conference on Computer and Communications Security (CCS 2018), pp. 1209-1222, ACM, 2018) proposed a homomorphic matrix-matrix multiplication method. It constructs several sophisticated permutations of the elements in the operand matrices, and thus eliminates the inter-slot summation when computing row-column dot products. However, it requires both or at least one of the operand matrices to be a square. It also needs to pack each matrix into multiple ciphertexts.

Accordingly, conventional methods suffer from various inefficiencies and restrictions, such as either restricting the row/column vector size to be power-of-two to enable more efficient inter-slots summation for dot product computation, or eliminating the inter-slots summation by sophisticated permutations of the matrix elements to pack into the ciphertexts, but on the other hand, may restrict the operand matrix to be a square, and also incur additional overhead of maskings and rotations.

A need therefore exists to provide a method of privacy-preserving logistic regression training based on homomorphically encrypted ciphertexts, and a system thereof, that seek to overcome, or at least ameliorate, one or more of the deficiencies in conventional methods/systems, such as but not limited to, improving computation efficiency and applicability (e.g., reducing or eliminating restrictions on matrix and/or vector sizes). It is against this background that the present invention has been developed.

SUMMARY

According to a first aspect of the present invention, there is provided a method of a method of privacy-preserving logistic regression training based on homomorphically encrypted ciphertexts, the method comprising:

obtaining a first packed ciphertext comprising at least a portion of a first training data sample packed into a first vector of slots thereof for training a privacy-preserving logistic regression model;

obtaining a second packed ciphertext comprising a plurality of weights of the privacy-preserving logistic regression model packed into a first vector of slots thereof;

determining at least a first output probability of the privacy-preserving logistic regression model based on the first packed ciphertext and the second packed ciphertext; and updating the plurality of weights based on the first output probability, wherein said determining at least the first output probability comprises performing a dot product between the first packed ciphertext and the second packed ciphertext, and said performing the dot product comprises:

multiplying the first vector of slots of the first packed ciphertext and the first vector of slots of the second packed ciphertext to obtain a plurality of first multiplication results in a first vector of slots of a first resultant ciphertext; and

4 performing a first inter-slot summation of the first vector of slots of the first resultant ciphertext to obtain a first dot product result of the dot product between the first packed ciphertext and the second packed ciphertext, wherein said performing the first inter-slot summation comprises:

obtaining a first binary representation corresponding to the number of slots in the first vector of slots of the first resultant ciphertext;

for each digit in the first binary representation having a first binary value from the digit being the second most significant digit to the digital being the least significant digit amongst all digits in the first binary representation having the first binary value, generating a first new ciphertext based on rotating an immediately preceding ciphertext thereof by a number of slots based on a digit position of the digit in the first binary representation, and adding the first new ciphertext with a ciphertext having an index corresponding to said digit position to produce a second new ciphertext; and determining a summation of the first vector of slots of the first resultant ciphertext based on the second new ciphertext produced for said digit in the first binary representation having the first binary value and being the least significant digit, to produce the first dot product result.

According to a second aspect of the present invention, there is provided a system for privacy-preserving logistic regression training based on homomorphically encrypted ciphertexts, the system comprising:

a memory; and at least one processor communicatively coupled to the memory and configured to:

obtain a first packed ciphertext comprising at least a portion of a first training data sample packed into a first vector of slots thereof for training a privacy-preserving logistic regression model;

obtain a second packed ciphertext comprising a plurality of weights of the privacy-preserving logistic regression model packed into a first vector of slots thereof;

determine at least a first output probability of the privacy-preserving logistic regression model based on the first packed ciphertext and the second packed ciphertext; and update the plurality of weights based on the first output probability, wherein said determine at least the first output probability comprises performing a dot product between the first packed ciphertext and the second packed ciphertext, and said perform the dot product comprises:

multiplying the first vector of slots of the first packed ciphertext and the first vector of slots of slots of the second packed ciphertext to obtain a plurality of first multiplication results in a first vector of slots of a first resultant ciphertext; and performing a first inter-slot summation of the first vector of slots of the first resultant ciphertext to obtain a first dot product result of the dot product between the first packed ciphertext and the second packed ciphertext, wherein

5

6 said performing the first inter-slot summation comprises:

obtaining a first binary representation corresponding to the number of slots in the first vector of slots of the first resultant ciphertext;

for each digit in the first binary representation having a first binary value from the digit being the second most significant digit to the digital being the least significant digit amongst all digits in the first binary representation having the first binary value, generating a first new ciphertext based on rotating an immediately preceding ciphertext thereof by a number of slots based on a digit position of the digit in the first binary representation, and adding the first new ciphertext with a ciphertext having an index corresponding to said digit position to produce a second new ciphertext; and determining a summation of the first vector of slots of the first resultant ciphertext based on the second new ciphertext produced for said digit in the first binary representation having the first binary value and being the least significant digit, to produce the first dot product result.

According to a third aspect of the present invention, there is provided a computer program product, embodied in one or more non-transitory computer-readable storage mediums, comprising instructions executable by at least one processor to perform a method of privacy-preserving logistic regression training based on homomorphically encrypted ciphertexts, the method comprising:

obtaining a first packed ciphertext comprising at least a portion of a first training data sample packed into a first vector of slots thereof for training a privacy-preserving logistic regression model;

obtaining a second packed ciphertext comprising a plurality of weights of the privacy-preserving logistic regression model packed into a first vector of slots thereof;

determining at least a first output probability of the privacy-preserving logistic regression model based on the first packed ciphertext and the second packed ciphertext; and updating the plurality of weights based on the first output probability, wherein said determining at least the first output probability comprises performing a dot product between the first packed ciphertext and the second packed ciphertext, and said performing the dot product comprises:

multiplying the first vector of slots of the first packed ciphertext and the first vector of slots of the second packed ciphertext to obtain a plurality of first multiplication results in a first vector of slots of a first resultant ciphertext; and performing a first inter-slot summation of the first vector of slots of the first resultant ciphertext to obtain a first dot product result of the dot product between the first packed ciphertext and the second packed ciphertext, wherein said performing the first inter-slot summation comprises:

obtaining a first binary representation corresponding to the number of slots in the first vector of slots of the first resultant ciphertext;

for each digit in the first binary representation having a first binary value from the digit being the second most significant digit to the digital being the least significant digit amongst all digits in the first binary representation having the first binary value, generating a first new ciphertext based on rotating an immediately preceding ciphertext thereof by a number of slots based on a digit position of the digit in the first binary representation, and adding the first new ciphertext with a ciphertext having an index corresponding to said digit position to produce a second new ciphertext; and determining a summation of the first vector of slots of the first resultant ciphertext based on the second new ciphertext produced for said digit in the first binary representation having the first binary value and being the least significant digit, to produce the first dot product result.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 1 depicts a schematic flow diagram of a method of privacy-preserving logistic regression training based on homomorphically encrypted ciphertexts, according to various embodiments of the present invention;

DETAILED DESCRIPTION

Figure 2:
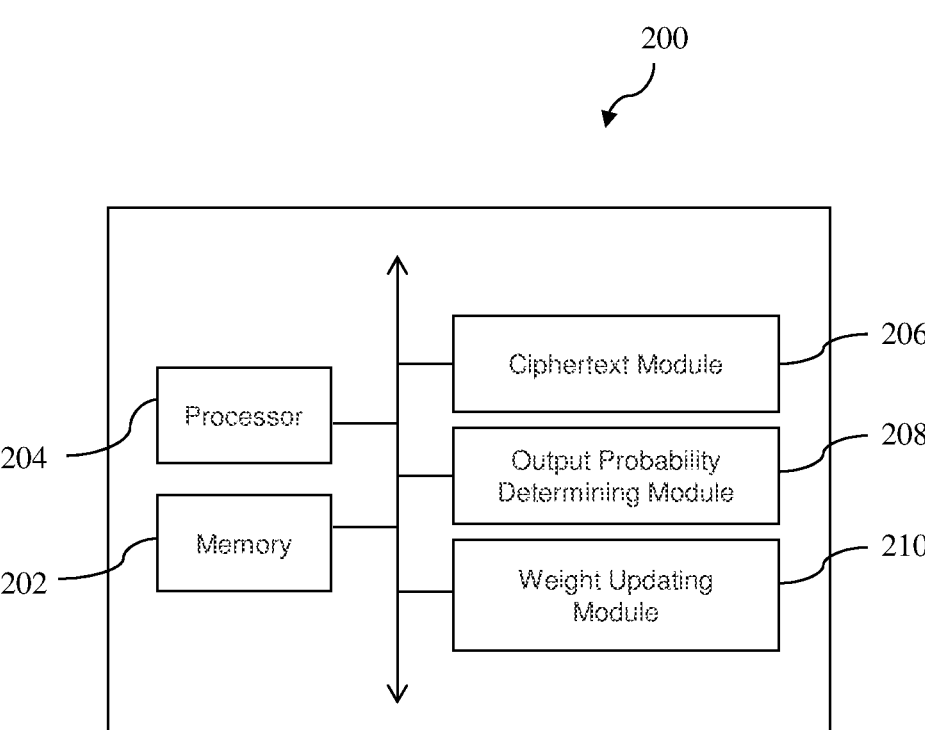
FIG. 2 depicts a schematic block diagram of a system for privacy-preserving logistic regression training based on homomorphically encrypted ciphertexts, according to various embodiments of the present invention.

Various embodiments of the present invention provide a method of privacy-preserving logistic regression training based on homomorphically encrypted ciphertexts, and a system thereof.

For example, as explained in the background, conventional methods of privacy-preserving logistic regression training suffer from various inefficiencies and restrictions, such as including homomorphic computations or operations (e.g., matrix-vector multiplication) that either restrict the row/column vector size to be power-of-two to enable more efficient inter-slots summation for dot product computation, or eliminate the inter-slots summation by sophisticated permutations of the matrix elements to pack into the cipher-texts, but on the other hand, may restrict the operand matrix to be a square, and also incur additional overhead of maskings and rotations.

Accordingly, various embodiments of the present invention provide a method of privacy-preserving logistic regression training based on homomorphically encrypted cipher-texts, and a system thereof, that seek to overcome, or at least ameliorate, one or more of the deficiencies in conventional methods/systems, such as but not limited to, improving computation efficiency and applicability (e.g., reducing or eliminating restrictions on matrix and/or vector sizes).

FIG. 1 depicts a schematic flow diagram of a method 100 of privacy-preserving logistic regression training based on homomorphically encrypted ciphertexts. The method 100 comprising: obtaining (at 102) a first packed ciphertext comprising at least a portion of a first training data sample packed into a first vector of slots thereof for training a privacy-preserving logistic regression model; obtaining (at 104) a second packed ciphertext comprising a plurality of weights of the privacy-preserving logistic regression model packed into a first vector of slots thereof; determining (at 106) at least a first output probability of the privacy-preserving logistic regression model based on the first packed ciphertext and the second packed ciphertext; and updating (at 108) the plurality of weights based on the first output probability.

The above-mentioned determining (at 106) at least the first output probability comprises performing a dot product between the first packed ciphertext and the second packed ciphertext. The above-mentioned performing the dot product comprises: multiplying the first vector of slots of the first packed ciphertext and the first vector of slots of the second packed ciphertext to obtain a plurality of first multiplication results in a first vector of slots of a first resultant ciphertext; and performing a first inter-slot summation of the first vector of slots of the first resultant ciphertext to obtain a first dot product result of the dot product between the first packed ciphertext and the second packed ciphertext. In particular, the above-mentioned performing the first inter-slot summation comprises: obtaining a first binary representation corresponding to (or representing) the number of slots in the first vector of slots of the first resultant ciphertext; for each digit in the first binary representation having a first binary value from the digit being the second most significant digit to the digital being the least significant digit amongst all digits in the first binary representation having the first binary value, generating a first new ciphertext based on rotating an immediately preceding ciphertext thereof by a number of slots based on a digit position of the digit in the first binary representation, and adding the first new ciphertext with a ciphertext having an index corresponding to the above-mentioned digit position to produce a second new cipher-text; and determining a summation of the first vector of slots of the first resultant ciphertext based on the second new ciphertext produced for the above-mentioned digit in the first binary representation having the first binary value and being the least significant digit, to produce the first dot product result.

In various embodiments, in relation to 102, the above-mentioned at least a portion of the first training data sample may be a portion (or a part) of the first training data sample or the whole or entire first training data sample. By way of an example only and without limitation, in various embodiments, one ciphertext (or a single ciphertext) typically have about 8,192 to 16,384 slots. Therefore, in practice or in most cases, there should be sufficient slots in the one ciphertext for the entire first training data samples (or multiple training samples) to be packed in the one ciphertext. Nevertheless, in the case where the privacy-preserving logistic regression model (or HE encrypted model) is too large, one training data sample may not be able to be packed into the one ciphertext. Therefore, in such a case and in various embodiments, a portion of the training data sample may be packed in a first ciphertext (e.g., the portion of the training data sample may be an amount that is able to be packed into the first ciphertext) and the remaining one or more portions of the training data sample may be packed into one or more subsequent ciphertexts (e.g., sequentially), respectively. Various operations or computations on such one or more subsequent ciphertexts may be performed in the same or corresponding manner as those performed on the first ciphertext and thus need not be repeated herein for clarity and conciseness.

Similarly, in relation to 104, in practice or in most cases, there should be sufficient slots in one ciphertext for a set of weights (e.g., all weights or a desired set of weights) of the privacy-preserving logistic regression model (or multiple replicas or duplicate sets of weights) to be packed in the one ciphertext. Nevertheless, in the above-mentioned case where the privacy-preserving logistic regression model is too large, similarly, the set of weights may not be able to be packed into one ciphertext. Therefore, in such a case and in various embodiments, a portion of the set of weights may be packed in a first ciphertext (e.g., the portion of the set of weights may be an amount that is able to be packed into the first ciphertext) and remaining one or more portions of the set of weights may be packed into one or more subsequent cipher-texts (e.g., sequentially), respectively. Similarly, various operations or computations on such one or more subsequent ciphertexts may be performed in the same or corresponding manner as those performed on the first ciphertext and thus need not be repeated herein for clarity and conciseness.

In various embodiments, the above-mentioned first and second ciphertexts are each homomorphically encrypted.

Accordingly, as will be described later below, in various embodiments, the above-mentioned first packed ciphertext may comprise a plurality of training data samples packed into a plurality of vectors of slots, respectively, thereof, for training the privacy-preserving logistic regression model. In this regard, the plurality of training data samples comprises the above-mentioned first training data sample and one or more second training data samples, and the plurality of vectors of slots of the first packed ciphertext comprises the above-mentioned first vector of slots and one or more second vectors of slots of the first packed ciphertext. In other words, each training data sample of the plurality of training data samples may be packed into a corresponding vector of slots of the first packed ciphertext. In various embodiments, for each vector of slots of the first packed ciphertext, there may be provided a corresponding vector of slots of the second packed ciphertext comprising the same plurality of weights packed therein. Accordingly, the plurality of vectors of slots of the second packed ciphertext may each have the same plurality of weights packed therein, and the number of vectors of slots of the second packed ciphertext may be the same as the number of vectors of slots of the first packed ciphertext (that is, the first and second packed ciphertext may have the same size (or the same number of data points)).

In various embodiments, the above-mentioned plurality of training data samples may be comprised in a mini-batch of training data samples. For example, the plurality of training data samples in plaintext may collectively have a data structure in the form of (or may be represented by) a matrix (data matrix), whereby each row (or column) of the matrix is a corresponding training data sample of the plurality of training data samples. Accordingly, each row of the matrix of training data samples may be packed into a corresponding vector of slots of the above-mentioned first packed cipher-text, and a corresponding vector of slots comprising the above-mentioned plurality of weights packed therein may be provided in the above-mentioned second packed ciphertext. In various embodiments, each training data sample may comprise a plurality of data points, each data point of training data sample being packed into a corresponding slot of the corresponding vector of slots of the above-mentioned first packed ciphertext. Similarly, the plurality of weights may comprise a plurality of data points, each data point (e.g., a corresponding weight) of the plurality of weights may be packed into a corresponding slot of the corresponding vector of slots of the above-mentioned second packed ciphertext.

By way of an example only and without limitation, in a practical application, at a client side, the training data samples may be packed into vectors of slots in a first plaintext, and then the first plaintext may be encrypted into the first packed ciphertext. Subsequently, the first packed ciphertext may be transmitted from the client side to a computation server which may be configured to perform the privacy-preserving logistic regression model training according to various embodiments of the present invention. On the other hand, the computation server may generate the second plaintext packed with vectors of weights, whereby the weights may comprise randomly initialized values. In various embodiments, the computation server may not be able to encrypt the second plaintext into the second packed ciphertext since it may not have the secret key of the client. However, the second plaintext packed with vectors of weights may automatically be transformed into the second packed ciphertext (packed with vectors of weights), after one round of training iteration with the first packed cipher-text sent from client as training inputs. In this regard, the second packed ciphertext corresponds to the same secret key as the first packed ciphertext, and thus only the client user is able to decrypt the second packed ciphertext.

In various embodiments, performing an inter-slot sum-mation of a vector of slots of a ciphertext refers to a summation of all elements (e.g., all encrypted data points) in the vector of slots, which may also be referred to as a parallel slot summation (or simply parallel summation) or a partial sum. For example, a ciphertext may comprise a plurality of vectors of slots, and the inter-slot summation on the cipher-text sums all elements within each individual vector of slots. After the inter-slot summation, the summation result of each vector of slots is stored in the last slot of that vector.

The method 100 of privacy-preserving logistic regression training based on homomorphically encrypted ciphertexts, whereby a dot product performed between the first and second packed ciphertexts during training comprises an inter-slot summation of a vector of slots performed in the manner as described has advantageously been found to improve computation efficiency and applicability (e.g., reducing or eliminating restrictions on matrix and/or vector sizes). These advantages or technical effects will become more apparent to a person skilled in the art as the method 100 of privacy-preserving logistic regression training is described in more detail according to various embodiments and example embodiments of the present invention.

In various embodiments, the above-mentioned first binary value is binary value of 1. In this regard, the above-mentioned each digit in the first binary representation having the first binary value means each digit in the first binary representation having a binary value of 1.

In various embodiments, the first new ciphertext is gen-erated based on rotating the immediately preceding cipher-text thereof by the number of slots determined based on a power of two with an exponent thereof having a value corresponding to the digit position of the digit in the first binary representation. In various embodiments, rotating a ciphertext by a number of slots refers to a circular shift (e.g., downward or clockwise direction) of the ciphertext by the number of slots. By way of an example only and without limitation, in the case of the number of slots being 7, thereby having a binary representation of '111', the three digits have three digit positions in the binary representation, such as a first position, a second position and a third position, respec-tively, from the rightmost (i.e., least significant digit) to leftmost (i.e., most significant digit) of the binary represen-tation. In this regard, the value corresponding to the digit position of the digit at the first position may be 0, the value corresponding to the digit position of the digit at the second position may be 1, and the value corresponding to the digit position of the digit at the third position may be 2. Accord-ingly, for example, for the digit at the second position, a power of two with an exponent thereof having the value of 1 is thus 2.

In various embodiments, the above-mentioned perform-ing the first inter-slot summation further comprises: for each digit in the first binary representation from the digit being the least significant digit to the digit being the second most significant digit, generating a third new ciphertext based on rotating an immediately preceding ciphertext thereof by a number of slots based on a digit position of the digit in the first binary representation.

In various embodiments, the third new ciphertext is generated based on rotating the immediately preceding ciphertext thereof by the number of slots determined based on a power of two with an exponent thereof having a value corresponding to the digit position of the digit in the first binary representation. In various embodiments, furthermore, for each group of consecutive slots of the first resultant ciphertext (e.g., every unique group thereof, including par-tially overlapping and non-overlapping groups), whereby the number of consecutive slots in each group is determined based on an index associated with the third new ciphertext (and more particularly, based on a power of two with the exponent thereof having a value corresponding to the index associated with the third new ciphertext), a predetermined slot (e.g., last slot) of the corresponding group of consecu-tive slots (same number of consecutive slots as the group of consecutive slots of the first resultant ciphertext) of the third new ciphertext comprises a summation result of the group of consecutive slots of the first resultant ciphertext (i.e., a summation of elements in the group of consecutive slots).

In various embodiments, a plurality of new ciphertexts are generated, comprising the above-mentioned third new ciphertext for the above-mentioned each digit in the first binary representation from the digit being the least signifi-cant digit to the digit being the second most significant digit and the above-mentioned first and second new ciphertexts for the above-mentioned each digit in the first binary rep-resentation from the digit being the second most significant digit to the digital being the least significant digit, each of the plurality of new ciphertexts having an index corresponding to an order (e.g., position) of the new ciphertext in the plurality of new ciphertexts. In various embodiments, the plurality of new ciphertexts may be ordered sequentially based on a chronological order with respect to when each new ciphertext is generated. Accordingly, the plurality of new ciphertexts may each be sequentially index according to the chronological order.

In various embodiments, the above-mentioned generating the first new ciphertext for the digit in the first binary representation being the second most significant digit is based on rotating the third new ciphertext generated for the digit in the first binary representation being the second most significant digit as the immediately preceding ciphertext thereof.

In various embodiments, the above-mentioned determining the summation of the first vector of slots of the first resultant ciphertext comprises obtaining a summation result of the first vector of slots of the first resultant ciphertext from a predetermined slot of the second new ciphertext produced for said digit in the first binary representation having the first binary value and being the least significant digit.

In various embodiments, as described hereinbefore, the above-mentioned first packed ciphertext comprises a plurality of training data samples packed into a plurality of vectors of slots, respectively, thereof, for training the privacy-preserving logistic regression model. In this regard, the plurality of training data samples comprising the above-mentioned first training data sample and one or more second training data samples, and the plurality of vectors of slots of the first packed ciphertext comprising the first vector of slots and one or more second vectors of slots of the first packed ciphertext. In other words, each training data sample of the plurality of training data samples may be packed into a corresponding plurality of vectors of slots of the first packed ciphertext. In various embodiments, the above-mentioned second packed ciphertext comprises a plurality of vectors of slots, each vector of slots having packed therein the plurality of weights, the plurality of vectors of slots of the second packed ciphertext comprising the first vector of slots and one or more second vectors of slots of the second packed ciphertext. In this regard, as described hereinbefore, for each vector of slots of the first packed ciphertext, there may be provided a corresponding vector of slots of the second packed ciphertext comprising the same plurality of weights packed therein. Accordingly, the plurality of first vectors of slots of the second packed ciphertext may each have the same plurality of weights packed therein, and the number of first vectors of slots of the second packed ciphertext may be the same as the number of first vectors of slots of the first packed ciphertext (that is, the first and second packed ciphertext may have the same size (or the same number of data points)). For example, as described hereinbefore, the above-mentioned plurality of training data samples may be comprised in a mini-batch of training data samples, and in plaintext may be organised or configured in the form of a matrix, whereby each row (or column) of the matrix is a corresponding training data sample of the plurality of training data samples. Accordingly, each row of the matrix of training data samples may be packed into a corresponding vector of slots of the above-mentioned first packed ciphertext, and a corresponding vector of slots comprising the above-mentioned plurality of weights packed therein may be provided in the above-mentioned second packed ciphertext. Accordingly, in various embodiments, the second packed ciphertext comprises a plurality of vectors of slots, each vector of slots having packed therein the plurality of weights, the plurality of vectors of slots of the second packed ciphertext comprising the first vector of slots and one or more second vectors of slots of the second packed ciphertext.

In various embodiments (e.g., in the case of the above-mentioned first packed ciphertext comprising a plurality of training data samples packed into a plurality of vectors of slots, respectively, thereof), the above-mentioned determining (at 106) at least the first output probability comprises determining a plurality of output probabilities of the privacy-preserving logistic regression model based on the first packed ciphertext and the second packed ciphertext, the plurality of output probabilities comprising the above-mentioned first output probability and one or more second output probabilities of the privacy-preserving logistic regression model. In various embodiments, one output probability may be determined for each vector of slots of the plurality of vectors of slots of the first packed ciphertext. In various embodiments, the above-mentioned updating (at 108) the plurality of weights comprises updating the plurality of weights based on the plurality of output probabilities. Furthermore, in various embodiments (e.g., in the case of the above-mentioned first packed ciphertext comprising a plurality of training data samples packed into a plurality of vectors of slots, respectively, thereof), the above-mentioned performing the dot product further comprises, for each second vector of slots of the above-mentioned one or more second vectors of slots of the first packed ciphertext: multiplying the second vector of slots of the first packed ciphertext and the corresponding second vector of slots of the second packed ciphertext to obtain a plurality of second multiplication results in a second vector of slots of the first resultant ciphertext; and performing a second inter-slot summation of the second vector of slots of the first resultant ciphertext to obtain a second dot product result of the dot product between the first packed ciphertext and the second packed ciphertext. Furthermore, the above-mentioned performing the second inter-slot summation comprises: obtaining a second binary representation corresponding to (e.g., representing) the number of slots in the second vector of slots of the first resultant ciphertext; for each digit in the second binary representation having the first binary value from the digit being the second most significant digit to the digital being the least significant digit amongst all digits in the second binary representation having the first binary value, generating a fourth new ciphertext based on rotating an immediately preceding ciphertext thereof by a number of slots based on a digit position of the digit in the second binary representation, and adding the fourth new ciphertext with a ciphertext having an index corresponding to said the above-mentioned digit position to produce a fifth new ciphertext; and determining a summation of the second vector of slots of the first resultant ciphertext based on the fifth new ciphertext produced for said the above-mentioned digit in the second binary representation having the first binary value and being the least significant digit to produce the second dot product result.

In various embodiments, for each second vector of slots of the above-mentioned one or more second vectors of slots of the first packed ciphertext, the above-mentioned performing the second inter-slot summation of the second vector of slots of the first resultant ciphertext to obtain a second dot product result of the dot product between the first packed ciphertext and the second packed ciphertext may be performed in the same or corresponding manner as the first inter-slot summation of the first vector of slots of the first resultant ciphertext as described hereinbefore according to various embodiments. In other words, for each vector of slots of the plurality of vectors of slots of the first packed ciphertext, the inter-slot summation of the vector of slots to obtain a corresponding dot product result of the dot product between the first packed ciphertext and the second packed ciphertext may be performed in the same or corresponding manner as the first inter-slot summation of the first vector of slots of the first resultant ciphertext as described hereinbefore according to various embodiments, and thus need not be repeated with respect to such an inter-slot summation performed (e.g., the above-mentioned second inter-slot summation) for clarity and conciseness.

In various embodiments, the above-mentioned performing the first inter-slot summation of the first resultant ciphertext and the above-mentioned performing the second inter-slot summation of the first resultant ciphertext are performed in parallel.

In various embodiments, the above-mentioned determining at least the first output probability further comprises applying an activation function on the first dot product result to produce the first output probability. The method 100 further comprises: determining a first loss gradient relating to the first training data sample based on the first output probability; and determining, for each of the plurality of weights, a second loss gradient relating to the weight based on the first loss gradient and a slot of the first vector of slots of the first packed ciphertext corresponding to the weight to obtain a plurality of second loss gradients relating to the plurality of weights, and the above-mentioned updating (at 108) the plurality of weights comprises updating the plurality of weights based on the plurality of second loss gradients relating to the plurality of weights.

In various embodiments (e.g., in the case of the above-mentioned first packed ciphertext comprising a plurality of training data samples packed into a plurality of vectors of slots, respectively, thereof), with respect to the above-mentioned determining the plurality of output probabilities, each output probability may be determined in the same or corresponding manner as the above-mentioned first output probability as described hereinbefore according to various embodiments, and thus need not be repeated with respect to each of the plurality of output probabilities for clarity and conciseness as described hereinbefore. Furthermore, for each of the plurality of output probabilities, a loss gradient relating to the corresponding training data sample and a loss gradient relating to each of the plurality of weights may be determined in the same or corresponding manner as described hereinbefore with respect to the first output probability, and thus need not be repeated with respect to each of the plurality of output probabilities for clarity and conciseness as described hereinbefore.

FIG. 2 depicts a schematic block diagram of a system 200 for privacy-preserving logistic regression training based on homomorphically encrypted ciphertexts, according to various embodiments of the present invention, such as corresponding to the method 100 of privacy-preserving logistic regression training based on homomorphically encrypted ciphertexts as described hereinbefore according to various embodiments of the present invention with reference to FIG. 1. The system 200 comprises: a memory 202; and at least one processor 204 communicatively coupled to the memory 202 and configured to: obtain a first packed ciphertext comprising at least a portion of a first training data sample packed into a first vector of slots thereof for training a privacy-preserving logistic regression model; obtain a second packed ciphertext comprising a plurality of weights of the privacy-preserving logistic regression model packed into a first vector of slots thereof; determine at least a first output probability of the privacy-preserving logistic regression model based on the first packed ciphertext and the second packed ciphertext; and update the plurality of weights based on the first output probability. The above-mentioned determine at least the first output probability comprises performing a dot product between the first packed ciphertext and the second packed ciphertext. In various embodiments, the above-mentioned perform the dot product comprises: multiplying the first vector of slots of the first packed ciphertext and the first vector of slots of slots of the second packed ciphertext to obtain a plurality of first multiplication results in a first vector of slots of a first resultant ciphertext; and performing a first inter-slot summation of the first vector of slots of the first resultant ciphertext to obtain a first dot product result of the dot product between the first packed ciphertext and the second packed ciphertext. In particular, the above-mentioned performing the first inter-slot summation comprises: obtaining a first binary representation corresponding to (e.g., representing) the number of slots in the first vector of slots of the first resultant ciphertext; for each digit in the first binary representation having a first binary value from the digit being the second most significant digit to the digital being the least significant digit amongst all digits in the first binary representation having the first binary value, generating a first new ciphertext based on rotating an immediately preceding ciphertext thereof by a number of slots based on a digit position of the digit in the first binary representation, and adding the first new ciphertext with a ciphertext having an index corresponding to said digit position to produce a second new ciphertext; and determining a summation of the first vector of slots of the first resultant ciphertext based on the second new ciphertext produced for said digit in the first binary representation having the first binary value and being the least significant digit, to produce the first dot product result.

It will be appreciated by a person skilled in the art that the at least one processor 204 may be configured to perform the required functions or operations through set(s) of instructions (e.g., software modules) executable by the at least one processor 204 to perform the required functions or operations. Accordingly, as shown in FIG. 2, the system 200 may comprise: a ciphertext module (or a ciphertext circuit) 206 configured to perform the above-mentioned obtaining a first packed ciphertext comprising at least a portion of a first training data sample packed into a first vector of slots thereof for training a privacy-preserving logistic regression model; and the above-mentioned obtaining a second packed ciphertext comprising a plurality of weights of the privacy-preserving logistic regression model packed into a first vector of slots thereof; an output probability determining module (or an output probability determining circuit) 208 configured to perform the above-mentioned determining at least a first output probability of the privacy-preserving logistic regression model based on the first packed ciphertext and the second packed ciphertext; and a weight updating module (or a weight updating circuit) 210 configured to perform the above-mentioned updating the plurality of weights based on the first output probability.

It will be appreciated by a person skilled in the art that the above-mentioned modules are not necessarily separate modules, and two or more modules may be realized by or implemented as one functional module (e.g., a circuit or a software program) as desired or as appropriate without deviating from the scope of the present invention. For example, two or more of the ciphertext module 206, the output probability determining module 208 and the weight updating module 210 may be realized (e.g., compiled together) as one executable software program (e.g., software application or simply referred to as an "app"), which for example may be stored in the memory 202 and executable by the at least one processor 204 to perform the functions/ operations as described herein according to various embodiments.

In various embodiments, the system 200 corresponds to the method 100 as described hereinbefore with reference to FIG. 1, therefore, various functions or operations configured to be performed by the least one processor 204 may correspond to various steps of the method 100 described hereinbefore according to various embodiments, and thus need not be repeated with respect to the system 200 for clarity and conciseness. In other words, various embodiments described herein in context of the methods (e.g., the method 100) are analogously valid for the respective systems (e.g., the system 200), and vice versa. For example, in various embodiments, the memory 202 may have stored therein the ciphertext module 206, the output probability determining module 208 and/or the weight updating module 210, each corresponding to one or more steps of the method 100 as described hereinbefore according to various embodiments, which are executable by the at least one processor 204 to perform the corresponding functions/operations as described herein.

A computing system, a controller, a microcontroller or any other system providing a processing capability may be provided according to various embodiments in the present disclosure. Such a system may be taken to include one or more processors and one or more computer-readable storage mediums. For example, the system 200 described hereinbefore may include a processor (or controller) 204 and a computer-readable storage medium (or memory) 202 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "training", "packing", "determining", "updating", "multiplying", "obtaining", "generating", "rotating", "performing" or the like, refer to the actions and processes of a computer system, or similar electronic device, that manipulates and transforms data represented as physical quantities within the computer system into other data similarly represented as physical quantities within the computer system or other information storage, transmission or display devices.

The present specification also discloses a system (e.g., which may also be embodied as a device or an apparatus), such as the system 200, for performing the operations/ functions of the method(s) described herein. Such a system may be specially constructed for the required purposes, or may comprise a general purpose computer or other device selectively activated or reconfigured by a computer program stored in the computer. The algorithms presented herein are not inherently related to any particular computer or other apparatus. Various general-purpose machines may be used with computer programs in accordance with the teachings herein. Alternatively, the construction of more specialized apparatus to perform the required method steps may be appropriate.

In addition, the present specification also at least implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention. It will be appreciated by a person skilled in the art that various modules described herein (e.g., the ciphertext module 206, the output probability determining module 208 and/or the weight updating module 210) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of a computer program/module or method described herein may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

In various embodiments, there is provided a computer program product, embodied in one or more computer-readable storage mediums (non-transitory computer-readable storage medium), comprising instructions (e.g., the ciphertext module 206, the output probability determining module 208 and/or the weight updating module 210) executable by one or more computer processors to perform a method 100 of privacy-preserving logistic regression training based on homomorphically encrypted ciphertexts, as described hereinbefore with reference to FIG. 1. Accordingly, various computer programs or modules described herein may be stored in a computer program product receivable by a system therein, such as the system 200 as shown in FIG. 2, for execution by at least one processor 204 of the system 200 to perform the required or desired functions.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

Figure 3:
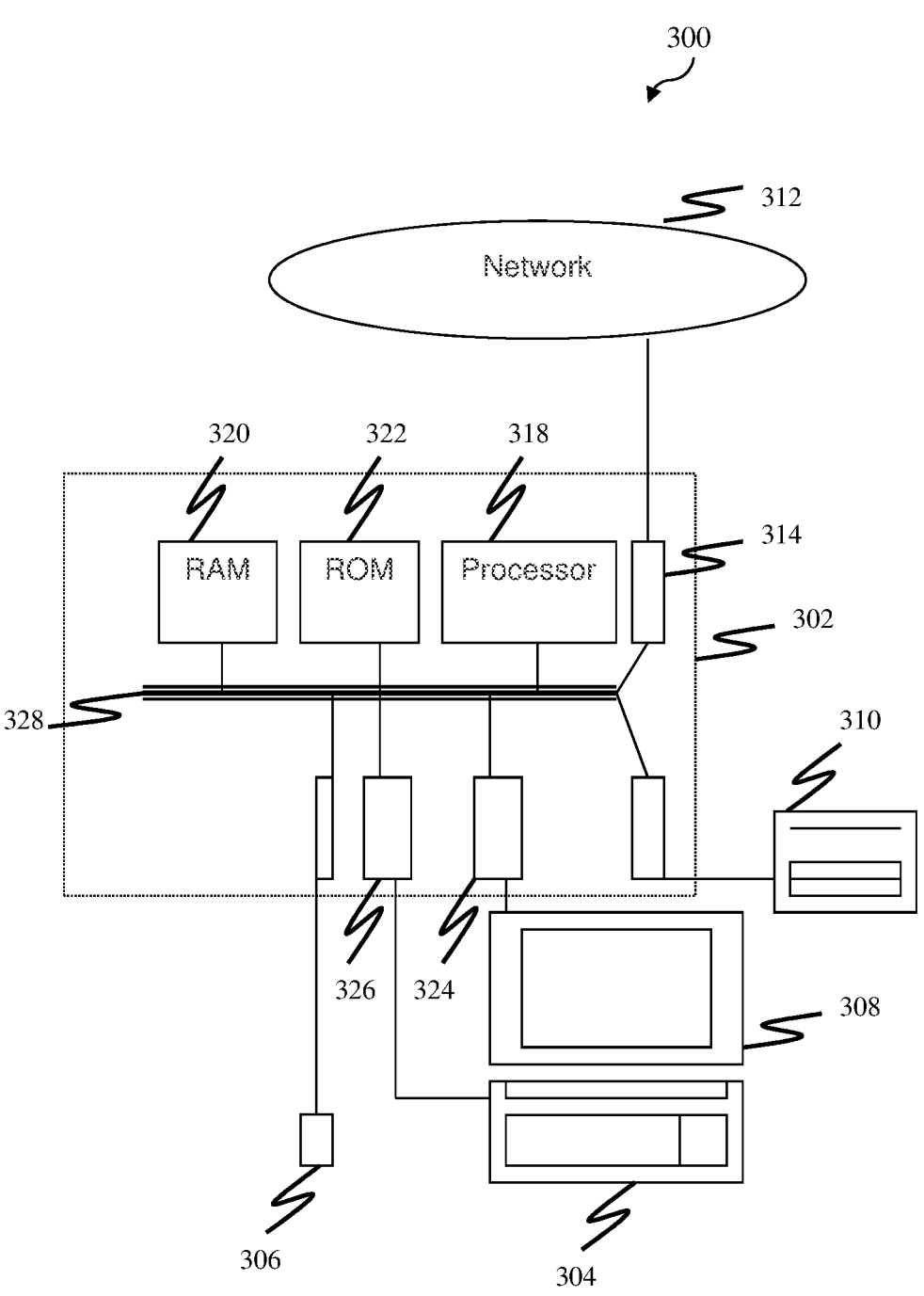
FIG. 3 depicts a schematic block diagram of an exemplary computer system in which the system for privacy-preserving logistic regression training based on homomorphically encrypted ciphertexts according to various embodiments of the present invention may be realized or implemented.

In various embodiments, the system 200 may be realized by any computer system (e.g., desktop or portable computer system) including at least one processor and a memory, such as a computer system 300 as schematically shown in FIG. 3 as an example only and without limitation. Various methods/steps or functional modules (e.g., the ciphertext module 206, the output probability determining module 208 and/or the weight updating module 210) may be implemented as software, such as a computer program being executed within the computer system 300, and instructing the computer system 300 (in particular, one or more processors therein) to conduct the methods/functions of various embodiments described herein. The computer system 300 may comprise a computer module 302, input modules, such as a keyboard 304 and a mouse 306, and a plurality of output devices such as a display 308, and a printer 310. The computer module 302 may be connected to a computer network 312 via a suitable transceiver device 314, to enable access to e.g., the Internet or other network systems such as Local Area Network (LAN) or Wide Area Network (WAN). The computer module 302 in the example may include a processor 318 for executing various instructions, a Random Access Memory (RAM) 320 and a Read Only Memory (ROM) 322. The computer module 302 may also include a number of Input/Output (I/O) interfaces, for example I/O interface 324 to the display 308, and I/O interface 326 to the keyboard 304. The components of the computer module 302 typically communicate via an interconnected bus 328 and in a manner known to the person skilled in the relevant art.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any reference to an element or a feature herein using a designation such as "first", "second" and so forth does not limit the quantity or order of such elements or features. For example, such designations may be used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any single item therein or any combination of two or more items therein.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

In particular, for better understanding of the present invention and without limitation or loss of generality, various example embodiments of the present invention will now be described with respect to a method of privacy-preserving logistic regression training based on homomorphically encrypted ciphertexts, including first and second packed ciphertexts corresponding to the first and second packed ciphertexts as described hereinbefore according to various embodiments in the case of the first packed ciphertext comprising a plurality of vectors of slots having packed therein a plurality of training data samples (which may simply be referred to as training samples herein), respectively, from a plurality of rows of a matrix of training samples in plaintext, and the second packed ciphertext comprising a plurality of vectors of slots, each vector of slots having the same plurality of weights packed therein. Accordingly, the method of privacy-preserving logistic regression training is described to include performing an inter-slot summation according to various example embodiments of the present invention for a dot product computation or operation between the above-mentioned first and second packed ciphertexts. In this regard, such a dot product between the first and second packed ciphertexts may be referred to as a homomorphic matrix-vector multiplication between the first and second packed ciphertexts in the sense that the first packed ciphertext comprises a plurality of vectors of slots having packed therein a plurality of training samples, respectively, from a plurality of rows of a matrix of training samples in plaintext, and the second packed ciphertext comprises a plurality of vectors of slots which are replicas of the vector of weights. The above-mentioned homomorphic matrix-vector multiplication may also interchangeably be referred to as an encrypted matrix-vector multiplication method (i.e., matrix-vector multiplication based on ciphertexts). However, it will be appreciated to a person skilled in the art that the present invention is not limited to the encrypted matrix-vector multiplication performed in a privacy-preserving logistic regression training, and may also apply to any homomorphic computations or operations required or performed in the privacy-preserving logistic regression training, as long as an inter-slot summation of a homomorphically encrypted ciphertext is required or performed, such as but not limited to, encrypted matrix-matrix multiplication (i.e., matrix-matrix multiplication based on ciphertexts), encrypted vector-vector multiplication (i.e., vector-vector multiplication based on ciphertexts), encrypted array summation, and so on.

Accordingly, various example embodiments provide a method of privacy-preserving logistic regression training based on homomorphically encrypted ciphertexts (e.g., corresponding to the method 100 of privacy-preserving logistic regression training based on homomorphically encrypted ciphertexts as described hereinbefore according to various embodiments), including a homomorphic matrix-vector multiplication method according to various example embodiments of the present invention.

Figure 4:
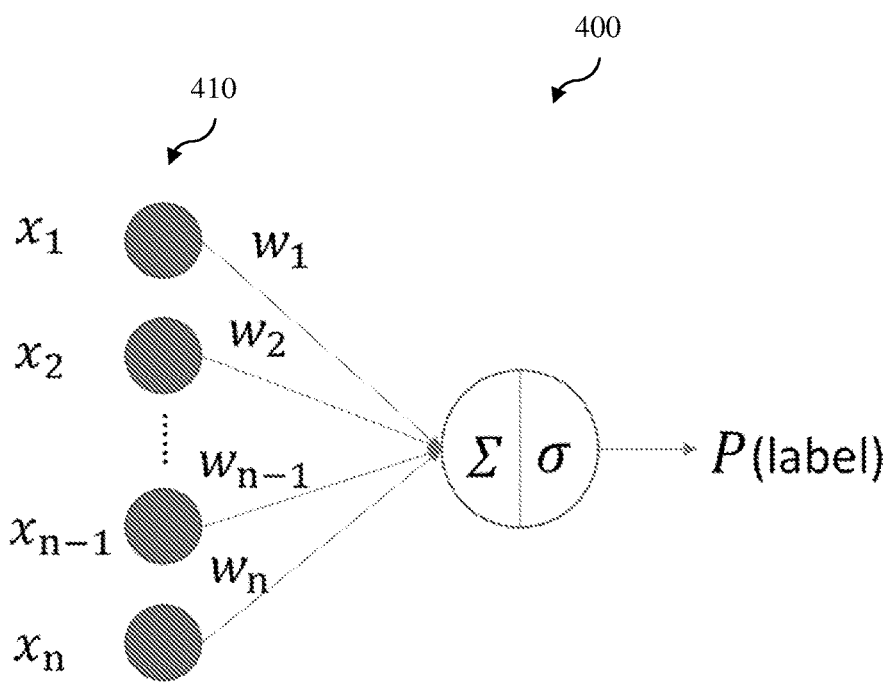
FIG. 4 depicts a schematic diagram of a logistic regression model (which may also be referred to as a classification model), according to various example embodiments of the present invention.

FIG. 4 depicts a schematic diagram of a logistic regression model 400 (which may also be referred to as a classification model) according to various example embodiments of the present invention. A logistic regression model 400 is known in the art and thus need not be described herein in detail. In general, a logistic regression model may comprise a plurality of weights (or weight parameters) 410 which may be trained using a training dataset (e.g., a plurality of training samples) for binary classification of an input data (e.g., to predict the class which input data belongs to). In various example embodiments, there may be provided logistic regression inference and training.

In various example embodiments, the logistic regression inference (or binary classification) may comprise two steps or stages, namely, a dot product step for obtaining a dot product between an input data vector (or input feature vector) and a weight vector, and an activation function step for obtaining an output probability of the logistic regression model in relation to the input data vector. For example, the dot product step may include a dot product between an input data vector x and a weight vector w, with the addition of a bias b, which may be expressed as:

$$z = \Sigma w_i x_i + b \qquad \text{(Equation 1)}$$

The activation function step may include applying a Sigmoid activation function a on the dot product result (z) to obtain an output probability (P). For example, the output probability (P) is the probability of the instance label being class 1 (as opposed to class 0), which may be expressed as:

$$P = \sigma(z) \qquad \text{(Equation 2)}$$

In various example embodiments, the logistic regression training may comprise a forward propagation step, a loss gradient determining step relating to a training sample, a backward propagation step and a weight update step.

The forward propagation step may include computing an output probability (P) of the logistic regression model based on an input data vector x and a weight vector w. In this regard, the output probability of the logistic regression model may be computed in the same or similar manner as described above in relation to the logistic regression inference and thus need not be repeated for conciseness.

The loss gradient determining step relating to the training sample may include computing a cross-entropy loss function (L) based on the above-mentioned output probability (P), which may be expressed as:

$$L = -[t \log P + (1-t) \log(1-P)] \qquad \text{(Equation 3)}$$

where t is the label to be 0 or 1, and denotes the ground-truth label for a training sample. For example, since a logistic regression model may be used for binary classification tasks, 0 may indicate that the training sample is a positive class and 1 may indicate that the training sample is a negative class.

The loss gradient determining step may further include determining the loss gradient relating to the linear layer output probability (z) (i.e., the above-mentioned dot product result, such as expressed in Equation (1)), which may be expressed as:

$$\frac{\partial L}{\partial z} = \sigma(z) - t \qquad \text{(Equation 4)}$$

The linear layer refers to a linear computation (e.g., add or multiply) part or component of the logistic regression model, and in this case, refers to the dot product between the input data vector x and the weight vector w.

The backward propagation step may include computing the loss gradient relating to the weights based on a chain rule, which may be expressed as:

$$\frac{\partial L}{\partial w_i} = \frac{\partial L}{\partial z} \frac{\partial z}{\partial w_i} = x_i \frac{\partial L}{\partial z} \qquad \text{(Equation 5)}$$

The weight update step may include updating the weights based on a mini-batch of m training samples (where $\mu$ is the learning rate), which may be expressed as:

$$w_i = w_i - \frac{\mu}{m} \sum_m \frac{\partial L}{\partial w_i} \qquad \text{Equation 6}$$

For example, a mini-batch of training samples may be the number of training samples in one round of training. For example, one training sample may comprises a plurality of data points, such as denoted by $x_1$ to $x_n$, and different training samples may be differentiated by different superscripts, such as denoted by $x_1^{\langle 0 \rangle}$ to $x_n^{\langle 0 \rangle}, \ldots, x_1^{\langle m \rangle}$ to $x_n^{\langle m \rangle}$. In various example embodiments, a mini-batch of training samples may be packed sequentially into one ciphertext.

As described in the background, data privacy is becoming an increasingly important issue in the hot data science industry. Homomorphic encryption (HE) enables computation directly on encrypted data, and ensures the privacy of data when applied with machine learning systems, and more particularly, logistic regression used in machine learning to construct classification models. For example, as the construction of such classification models is based on computation with large datasets (e.g., training samples), such computation may be outsourced to a server (e.g., cloud server). However, such training samples may be sensitive and thus, the training samples may be encrypted, and in particular, homomorphically encrypted prior to being outsourced to preserve privacy. Accordingly, homomorphic encryption enables computation directly on encrypted data, without decryption and may thus be used to mitigate privacy concerns. Accordingly, various example embodiments provide a method of privacy-preserving logistic regression training based on homomorphically encrypted ciphertexts (e.g., corresponding to the method 100 of privacy-preserving logistic regression training based on homomorphically encrypted ciphertexts as described hereinbefore according to various embodiments), including a homomorphic matrix-vector multiplication method (in particular, homomorphic matrix-vector multiplication on homomorphically encrypted ciphertexts) according to various example embodiments of the present invention.

In various example embodiments, the privacy-preserving logistic regression training may also comprise a forward propagation step, a loss gradient determining step relating to a training sample, a backward propagation step and a weight update step, corresponding to the above-mentioned steps of the logistic regression training as described above.

In various example embodiments, a plurality of training samples (e.g., a matrix of training samples, such as a mini-batch) may be densely packed (i.e., fully compactly packed) in one ciphertext (e.g., a first packed ciphertext), whereby each row (or column) of the matrix is a corresponding training sample of the plurality of training samples. Accordingly, each row of the matrix of training samples may be packed into a corresponding vector of slots of the first packed ciphertext. Furthermore, a corresponding vector of slots comprising a plurality of weights of the privacy-preserving logistic regression model densely packed therein (i.e., fully compactly packed) may be provided in another ciphertext (e.g., a second packed cipertext). That is, for each vector of slots of the first packed ciphertext, there is provided a corresponding vector of slots of the second packed ciphertext comprising the same plurality of weights (i.e., replicas or duplicates) packed therein. In various example embodiments, the plurality of vectors of slots of the first packed ciphertext may be sequentially arranged (e.g., stacked) therein. Similarly, the plurality of vectors of slots of the second packed ciphertext may be sequentially arranged (e.g., stacked) therein. Thereafter, privacy-preserving logistic regression training based on the first packed ciphertext and the second packed ciphertext according to various example embodiments may be performed. In particular, as mentioned above, an inter-slot summation according to various example embodiments of the present invention may be performed for a dot product computation or operation between the first and second packed ciphertexts, which may also be referred to as a homomorphic matrix-vector multiplication between the first and second packed ciphertexts (or an encrypted matrix-vector multiplication method (i.e., matrix-vector multiplication based on ciphertexts).

The forward propagation step may include computing an output probability (P) of the privacy-preserving logistic regression model based on the first packed ciphertext and a second packed ciphertext, such as based on the above-mentioned Equations (1) and (2). In particular, a dot product between the first packed ciphertext and the second packed ciphertext may be performed to obtain a dot product result and an activation function may then be applied to the dot product result to obtain the output probability. In various example embodiments, the dot product between the first packed ciphertext and the second packed ciphertext may include multiplying a first vector of slots of the first packed ciphertext and a corresponding first vector of slots of the second packed ciphertext to obtain a plurality of first multiplication results in a first vector of slots of a first resultant ciphertext. That is, each slot of the first vector of slots of the first resultant ciphertext comprises a corresponding first multiplication result of the plurality of first multiplication results.

Figure 5A:
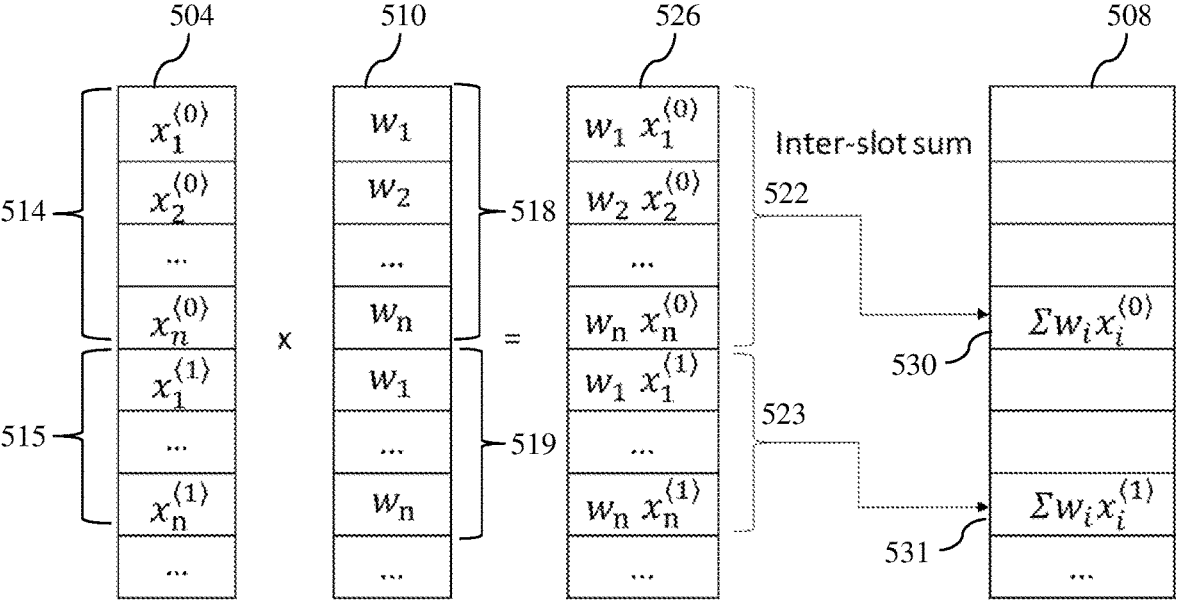
FIGS. 5A to 5D depict schematic diagrams illustrating a homomorphic multiplication method, according to various example embodiments of the present invention.

By way of an example for illustration purpose only and without limitation, FIG. 5A depicts a schematic diagram illustrating a dot product between the first packed ciphertext 504 and the second packed ciphertext 510 performed, according to various example embodiments of the present invention. For example, as shown in FIG. 5A, performing the dot product comprises multiplying the first vector 514 of slots of the first packed ciphertext 504 and the first vector 518 of slots of the second packed ciphertext 510 to obtain a plurality of first multiplication results in a first vector 522 of slots of a first resultant ciphertext 526; and performing a first inter-slot summation of the first vector 522 of slots of the first resultant ciphertext 526 to obtain a first dot product result 530 of the dot product between the first packed ciphertext 504 and the second packed ciphertext 510. As described hereinbefore, for example, each training sample of the plurality of training samples (e.g., each row of a matrix of training samples) may be packed (sequentially) into a corresponding vector of slots of the first packed ciphertext 504. By way of an example only and without limitation, as illustrated in FIG. 5A, the plurality of training samples may include a first training sample <0> packed into a first vector 514 of slots, a second training sample <1> packed into a second vector 515 of slots, and so on. As also illustrated in FIG. 5A, the plurality of weights may be packed into each of the plurality of vectors of slots of the second packed ciphertext 510, such as a first vector 518 of slots, a second vector 519 of slots, and so on. In various example embodiments, the vector size (i.e., number of data points) of the plurality of vectors of slots of the second packed ciphertext 510 is the same as the vector size of the plurality of vectors of slots of the first packed ciphertext 504. In other words, the weight vector size and the training sample vector size (i.e., number of data points) are the same.

In various example embodiments, in accordance with the above-mentioned Equation (1), the first dot product result 530 may then be added with a bias b to obtain an adjusted (bias adjusted) first dot product result 534 in a first resultant ciphertext 508.

The dot product result between each vector of slots of the plurality of vectors of slots of the first packed ciphertext 504 and the corresponding vector of slots of the plurality of vectors of slots of the second packed ciphertext 510 may be obtained in the same or corresponding manner as the first dot product result 530 between the first vector 514 of slots of the first packed ciphertext 504 and the second vector 518 of slots of the second packed ciphertext 510 as described above, and thus need not be repeated herein for clarity and conciseness. By way of an example, a second dot product result 531 in the first resultant ciphertext 508 between the second vector 515 of slots of the first packed ciphertext 504 and the second vector 519 of slots of the second packed ciphertext 510 in the same or corresponding manner as described above in relation to the above-mentioned first dot product result 530.

Figure 5B:
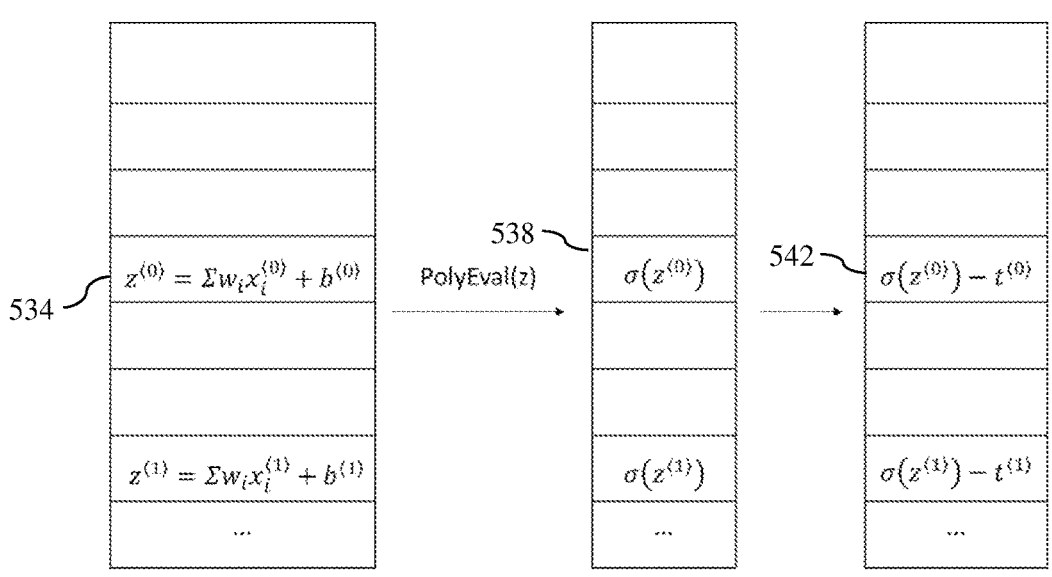

By way of an example for illustration purpose only and without limitation, FIG. 5B depicts a schematic diagram illustrating an activation function being applied on the first dot product result (i.e., the adjusted first dot product result (z) 534) to produce the first output probability 538 and a loss gradient being computed relating to the first training data sample based on the first output probability 538. For example, as shown in FIG. 5B, a Sigmoid activation function in the form of a polynomial function PolyEval( ) may be applied on the adjusted first dot product result (z) 534 to produce the first output probability 538. Thereafter, a loss gradient 542 (e.g., corresponding to the first loss gradient as described hereinbefore according to various embodiments) relating to the first training data sample may be computed based on the first output probability 538 according to the above-mentioned Equation (4).

Figure 5C:
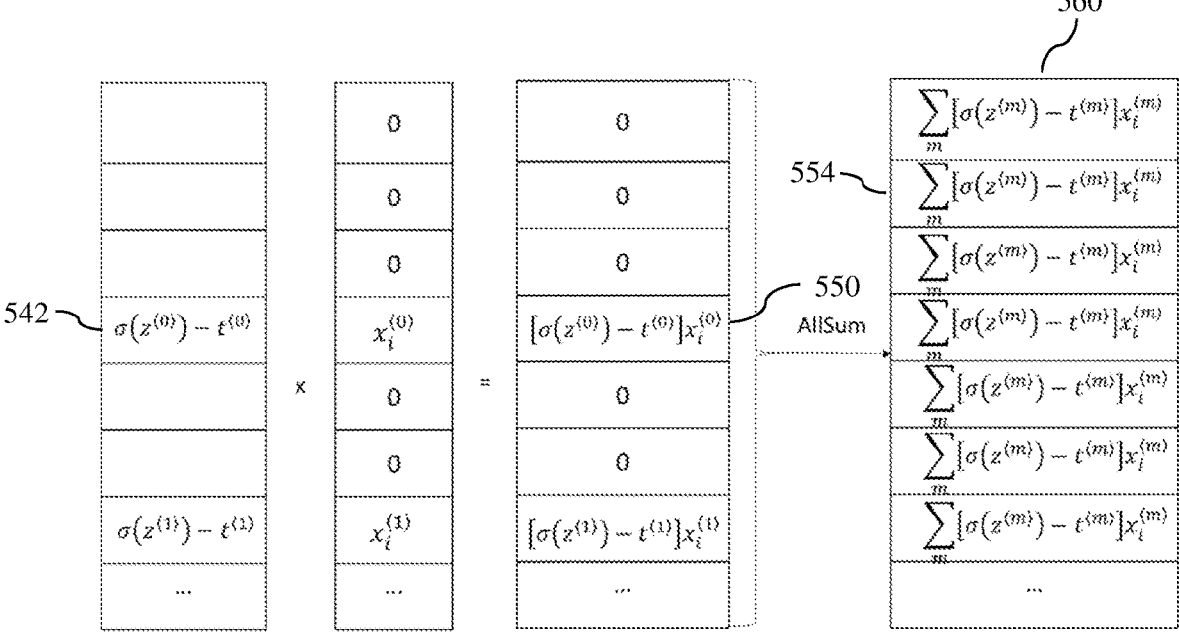

Thereafter, as shown in FIG. 5C, backward propagation may be performed, including determining, for each of the plurality of weights, a loss gradient 550 (e.g., corresponding to the second loss gradient as described hereinbefore according to various embodiments) relating to the weight based on the above-mentioned loss gradient 542 relating to the first training sample and a slot (i.e., the encrypted data point $x_i^{(0)}$ of the first training sample ⟨0⟩ stored therein) of the first vector 514 of slots of the first packed ciphertext 504 corresponding to the weight to obtain a plurality of loss gradients relating to the plurality of weights (relating to the first training sample). In various example embodiments, for each weight $w_i$ from i=1 to i=n, a loss gradient relating to the weight may be determined in the same or corresponding manner as described above for the loss gradient 550. Furthermore, for each of the plurality of weights, a loss gradient relating to the weight may be determined based on the loss gradient relating to the corresponding training sample of the plurality of training samples in the same or corresponding manner as described hereinbefore in relation to the first training sample to obtain a plurality of loss gradients relating to the plurality of weights (relating to the corresponding training sample). By way of an example, for each of the plurality of weights, a loss gradient relating to the weight may be determined based on the loss gradient relating to the second training sample (e.g., the second training sample ⟨1⟩) in the same or corresponding manner as described hereinbefore in relation to the first training sample ⟨0⟩ to obtain a plurality of loss gradients relating to the plurality of weights (relating to the second training sample ⟨1⟩). In various example embodiments, for each of the plurality of weights, all of the loss gradients relating to that particular weight obtained based on the plurality of training samples packed in the first packed ciphertext 508 may be summed up to obtain a corresponding summed loss gradient 554 in a second resultant ciphertext 560. For example, as shown in FIG. 5C, the summed loss gradient 554 obtained for the particular weight may be replicated or duplicated in a plurality of slots (e.g., all slots) of the second resultant ciphertext 560. In various example embodiments, the above-mentioned summation of the loss gradients relating to a weight may be performed according to the inter-slot summation method as described herein according to various example embodiments, except that the summation result (e.g., the summed loss gradient 554) is stored in a plurality of slots (e.g., all slots) of the resultant ciphertext, such as shown in the above-mentioned second resultant ciphertext 560.

Figure 5D:
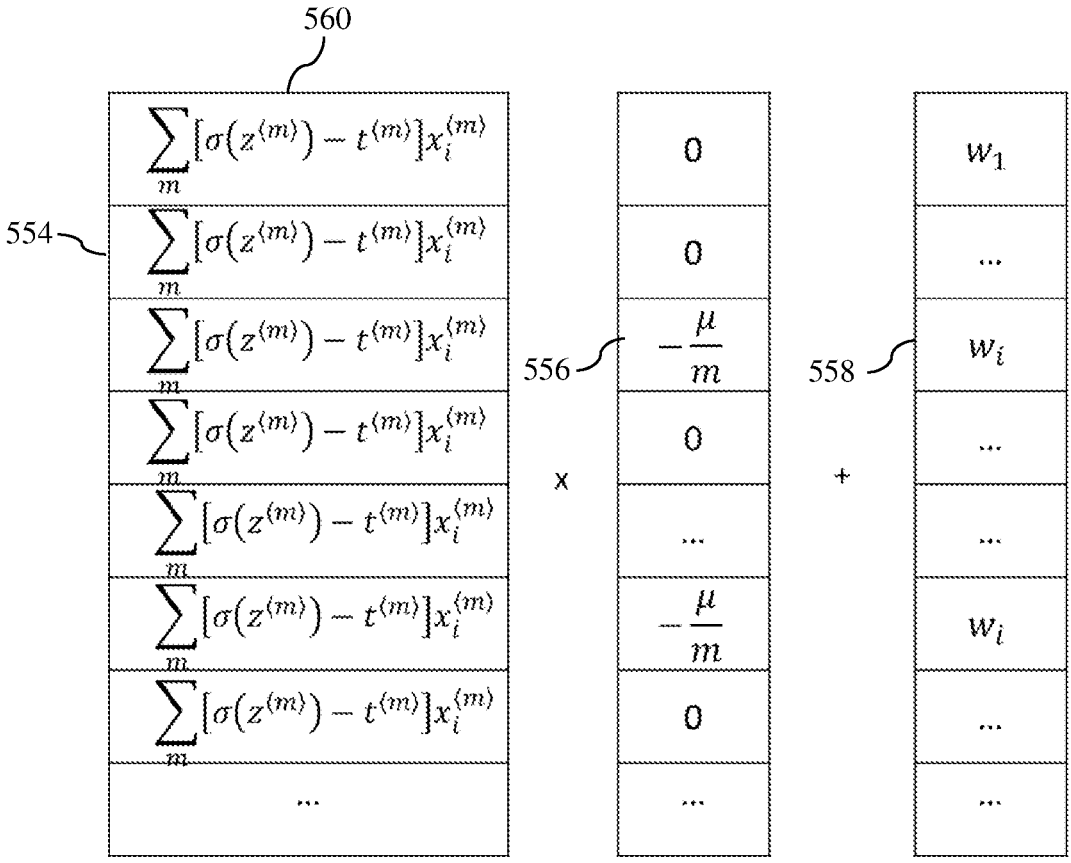

Subsequently, the plurality of weights may be updated based on the plurality of loss gradients determined (in particular, the plurality of summed loss gradients determined) relating to the plurality of weights. By way of an example only and without limitation, FIG. 5D depicts a schematic drawing illustrating a weight $w_i$ 558 of the plurality of weights ($w_1$ to $w_n$) being updated based on the corresponding summed loss gradient 554 determined for that weight $w_i$ 558. In various example embodiments, the weight $w_i$ 558 (e.g., having a current value) may be updated based on the summed loss gradient 554 and a learning rate $\mu$ 556, and more particularly, a multiplication of the summed loss gradient 554 and the learning rate 556. In this regard, as shown in FIG. 5D, the learning rate 556 may be divided by the number of training samples (i.e., m) in the plurality of training samples (e.g., mini-batch of training samples) based on which the summed loss gradient 554 is obtained. This is to average the summed loss gradient 554 as it has not been averaged. Furthermore, since a current weight $w_i$ 558 may be updated by subtracting the weight adjustment determined from the current weight $w_i$ 558, the learning rate 556 may further have a negative sign (or a minus sign) applied thereto, that is, $-\mu/m$, as shown in FIG. 5D. Accordingly, each weight $w_i$ of the plurality of weights (e.g., from i=1 to i=n) may be updated in the same or corresponding manner as described above, such that the plurality of weights are updated.

Accordingly, privacy-preserving logistic regression training based on homomorphically encrypted ciphertexts (e.g., the above-mentioned first and second packed ciphertexts) obtained based on the above-mentioned plurality of training samples (e.g., a mini-batch or matrix of training samples) may be performed as described hereinbefore with reference to FIGS. 5A to 5D to update (or train) the plurality of weights of the privacy-preserving logistic regression model. It will be appreciated by a person skilled in the art that the plurality of weights may be further updated (or trained) based on additional plurality of training samples (e.g., additional mini-batches or matrices of training samples) in the same or corresponding manner as described hereinbefore with reference to FIGS. 5A to 5D.

The inter-slot summation method according to various example embodiments will now be described below.

In various example embodiments, the inter-slot summation method may be configured to perform parallel summation of a vector (e.g., a range or an interval) of slots (e.g., an arbitrary number of slots) within a ciphertext. In contrast, for example, conventional methods may only be able to perform efficient parallel summation when the number of slots to be summed is a power-of-two, while the inter-slot summation method according to various example embodiments is able to perform efficient parallel summation for an arbitrary number of slots. By way of an example for illustration purpose only and without limitation, the inter-slot summation method according to various example embodiments will be described below in relation to a matrix-vector multiplication without any size restrictions.

Figure 6A:
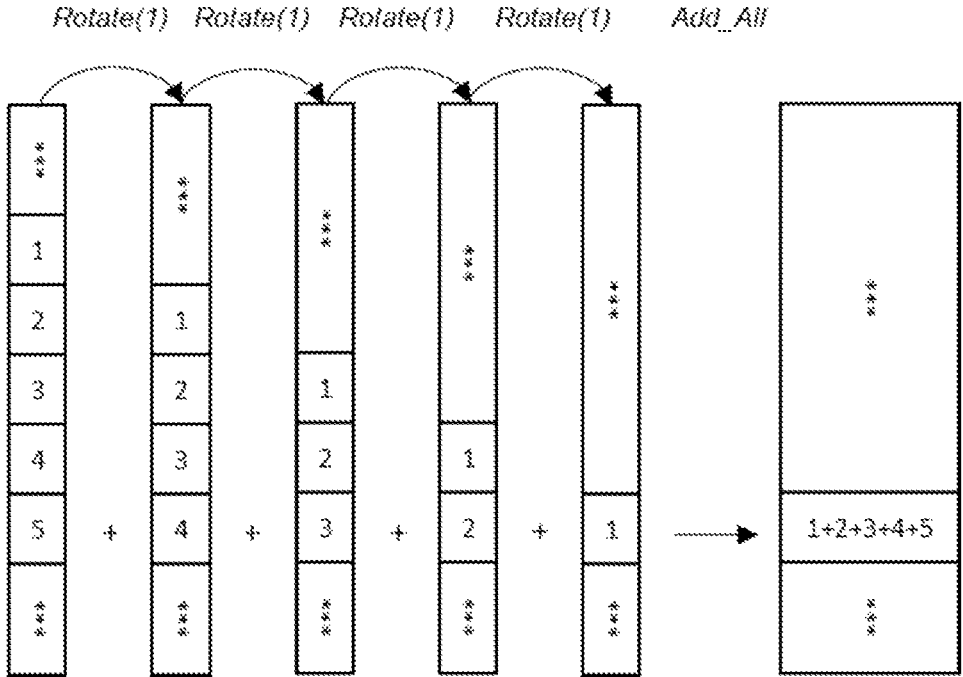
FIGS. 6A and 6B depict schematic diagrams illustrating two conventional inter-slot summation method.

A naïve method to perform parallel summation of a range of slots (e.g., n slots) in a ciphertext may be to sequentially rotate the ciphertext by one slot at a time. After rotating it for n−1 times, all the n−1 intermediate ciphertexts may be summed together with the original ciphertext, and it can produce the sum of every n-slot interval in the ciphertext. In this regard, the complexity for rotating the ciphertext is O(n), which is too high since n is usually a very large number in AI models in real-world applications. FIG. 6A depicts a schematic diagram illustrating an example of the naïve method in performing the parallel summation of slots. It will be appreciated by a person skilled in the art that the number inside each slot represents the relative index of the slot in the interval (or vector).

Figure 6B:
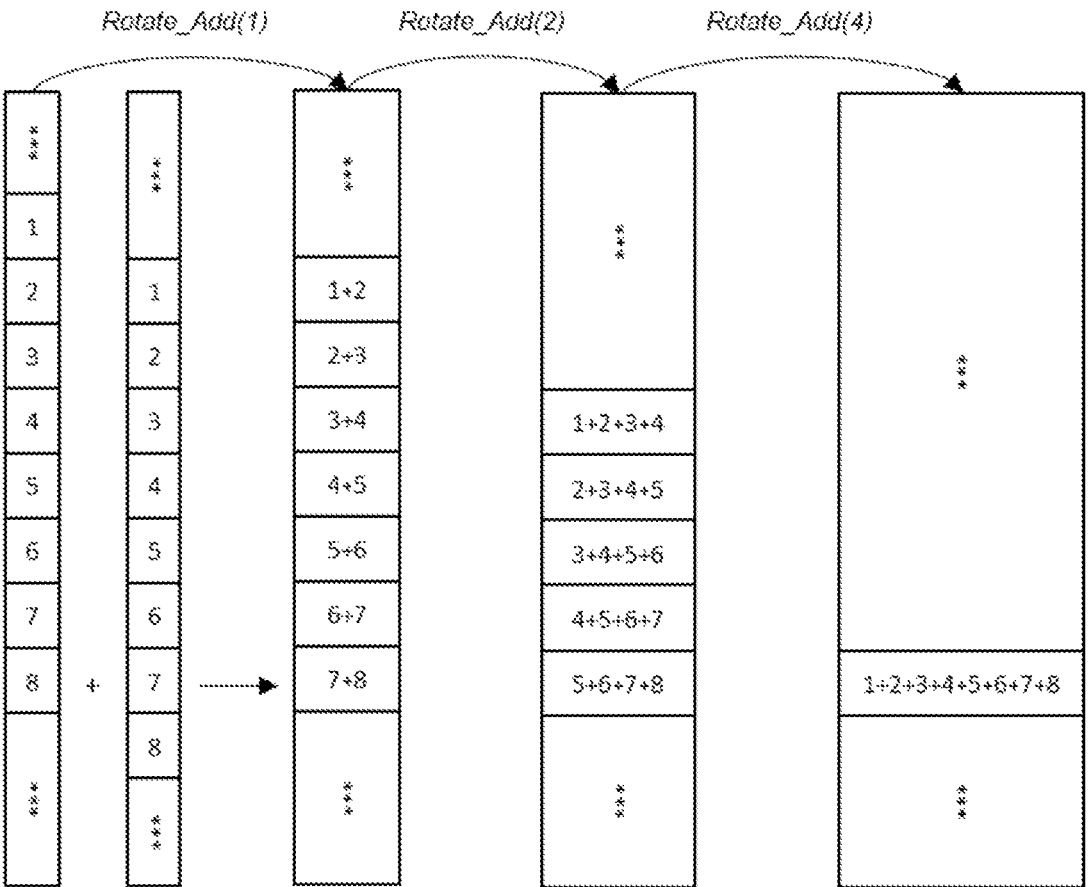

As another example, when the number of slots n to be summed is a power-of-two, there exists a conventional optimized method to perform the parallel summation of the range of slots. In particular, instead of rotating the ciphertext one slot at a time, the method may employ a set of gradually increased rotation steps which are powers of two, starting from one and ending at the logarithm of n. In implementation of modern homomorphic encryption (HE) libraries, rotating power-of-two steps is usually as efficient as rotating one step, thus the total rotating complexity is reduced to $O(\log_2 n)$. FIG. 6B depicts a schematic diagram illustrating the conventional optimized method in performing the parallel summation for power-of-two slots. However, various example embodiments note that such a method cannot be applied to parallel summation of non-power-of-two number of slots, which is usually the case in real-world applications.

In contrast, the inter-slot summation method according to various example embodiments is able to perform efficient parallel summation for an arbitrary number of slots (e.g., without the power-of-two number of slots restriction). In particular, the inter-slot summation method according to various example embodiments for performing parallel summation of all slots in a vector (or range or interval) of n slots in a ciphertext, where n is an arbitrary number, may comprise the following steps:

1. Represent n in its binary format, for example, $n=(b_k b_{k-1} \ldots b_0)_2$, where $b_i \in \{0, 1\}$ and $k=\lfloor \log_2 n \rfloor$. For example, this step or stage corresponds to, obtaining a first binary representation (e.g., n) corresponding to the number of slots in the first vector of slots of the first resultant ciphertext, as described hereinbefore according to various embodiments.

2. Rotate and add the ciphertext $C_0$ 702 by gradually increasing power-of-two steps, starting at 1 and ending at $2^{k-1}$. This process may produce k–1 intermediate ciphertexts $C_1, \ldots, C_{k-1}$ (e.g., 704 and 706 in FIG. 7), where $C_i$ contains the sum of $2^i$ consecutive slots of ciphertext $C_0$ 702 at the last slot of the $2^i$ corresponding consecutive slots of the new intermediate ciphertext $C_i$. For example, this step or stage may correspond to, for each digit in the first binary representation (e.g., n) from the digit being the least significant digit to the digit being the second most significant digit (e.g., in the example of n, from $b_0$ to $b_{k-1}$), generating a third new ciphertext (e.g., intermediate ciphertext $C_1$ 704 for $b_0$ and intermediate ciphertext $C_2$ 706 for $b_1$) based on rotating an immediately preceding ciphertext (e.g., ciphertext $C_0$ 702 is the immediately preceding ciphertext of ciphertext $C_1$ 704) thereof by a number of slots based on a digit position of the digit in the first binary representation, as described hereinbefore according to various embodiments, and more particularly, by the number of slots determined based on a power of two with an exponent thereof having a value corresponding to the digit position of the digit in the first binary representation, as described hereinbefore according to various embodiments. Furthermore, for each group of consecutive slots of the first resultant ciphertext (e.g., $C_0$) 702, whereby the number of consecutive slots in each group is determined based on an index associated with the third new ciphertext (and more particularly, based on a power of two with the exponent thereof having a value corresponding to the index associated with the third new ciphertext (e.g., a group of 4 consecutive slots of the first resultant ciphertext for the ciphertext $C_2$ 706 having an index of 2)), a predetermined slot (e.g., last slot 722) of the corresponding group of consecutive slots (same number of consecutive slots as the group of consecutive slots of the first resultant ciphertext 702) of the third new ciphertext (e.g., ciphertext $C_2$ 706) comprises a summation result (e.g., slots 1+2+3+4) of the group of consecutive slots of the first resultant ciphertext 702 (i.e., a summation of elements (e.g. elements in slots 1, 2, 3 and 4) in the group of consecutive slots).

3. Let $C=C_k$. Starting from $b_k$, find the second largest digit $b_j$ in the binary representation of n such that $b_j=1$. Rotate C by $2^j$ steps and add it (slot-wise addition) with $C_j$. For example, this step or stage may correspond to, for each digit in the first binary representation having a first binary value (e.g., binary value of 1) from the digit being the second most significant digit to the digital being the least significant digit amongst all digits in the first binary representation (e.g., in the example of n, the first binary representation of 7 is '111', hence from $b_{k-1}$ to $b_0$) having the first binary value, generating a first new ciphertext based on rotating an immediately preceding ciphertext thereof by a number of slots based on a digit position of the digit in the first binary representation, and adding the first new ciphertext with a ciphertext having an index corresponding to the above-mentioned digit position to produce a second new ciphertext. More particularly, the first new ciphertext may be generated based on rotating the immediately preceding ciphertext thereof by the number of slots determined based on a power of two with an exponent thereof (e.g., by $2^j$) having a value corresponding to the digit position of the digit in the first binary representation, as described hereinbefore according to various embodiments.

4. Continue to find the next non-zero digit in the remaining part (e.g., remaining digit(s)) of the binary representation of n, rotate C and add it (slot-wise addition) with the corresponding intermediate ciphertext. Repeat this step until there is no more non-zero digit in the remaining part of the binary representation of n.

5. The last slot 716 of consecutive n slots (e.g., corresponding to the predetermined slot of the second new ciphertext as described hereinbefore according to various embodiments) in C contains the sum of the n-slot interval in the original ciphertext $C_0$ 702. For example, this step or stage may correspond to, determining a summation of the first vector of slots of the first resultant ciphertext (e.g., $C_0$ 702) based on the second new ciphertext (e.g., the last ciphertext 714 generated in FIG. 7) produced for the above-mentioned digit in the first binary representation having the first binary value and being the least significant digit, to produce the first dot product result (e.g., the dot product result in slot 716 in FIG. 7).

Figure 7:
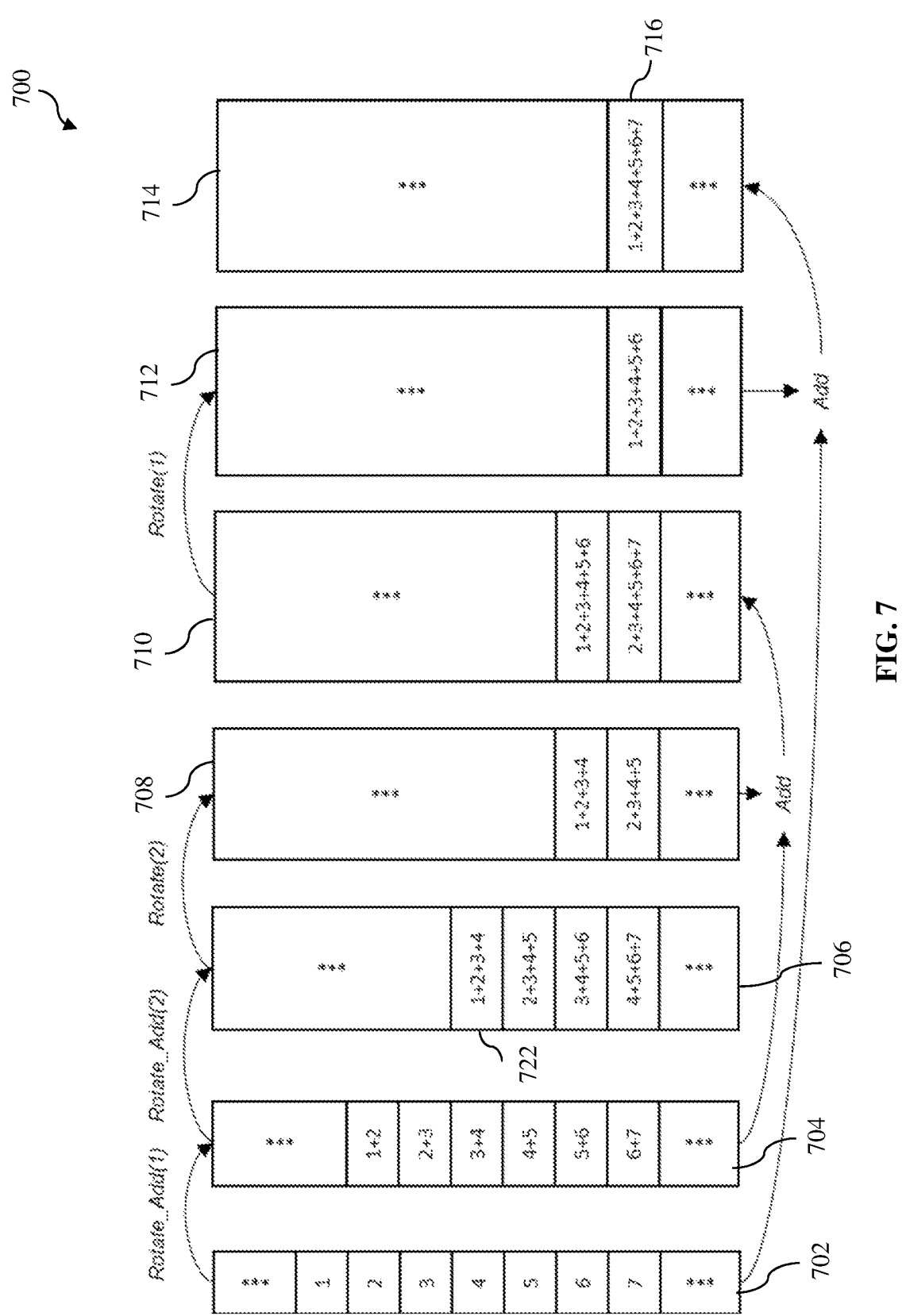
FIG. 7 depicts a schematic diagram illustrating an example inter-slot summation method, according to various example embodiments of the present invention.

Accordingly, FIG. 7 depicts a schematic diagram illustrating an example inter-slot summation method 700 according to various example embodiments for performing parallel summation of all slots in a vector of n slots in a ciphertext 702, where n is 7. That is, the example inter-slot summation method 700 computes a partial sum of a ciphertext 702 in the interval (or vector) of 7 slots. It will be appreciated by a persons skilled in the art that although only one interval of 7 slots is shown in FIG. 7, the method 700 may compute the sum of multiple 7-slot intervals (or n-slot intervals) concurrently (i.e., in parallel). Accordingly, a plurality of inter-slot summations may be performed in parallel, and each inter-slot summation may be performed on a respective interval (or vector) of slots of the ciphertext, such as illustrated in FIG. 5A whereby the respective inter-slot summation of each vector of slots (e.g., inter-slot summation of the first vector 522 of slots and inter-slot summation of the second vector 523 of slots shown in FIG. 5A) of the first resultant ciphertext 526 may be performed in parallel.

From the above-described the inter-slot summation method according to various example embodiments, it can be seen that the total number of rotation operations equals k added by the number of non-zero bits in the binary representation of n except the highest bit. Accordingly, it is clear that this number is less than or equal to 2k, which is $2 \log_2 n$. Thus, the rotation complexity of the inter-slot summation method according to various example embodiments is advantageously still $o(\log_2 n)$.

Figure 8:
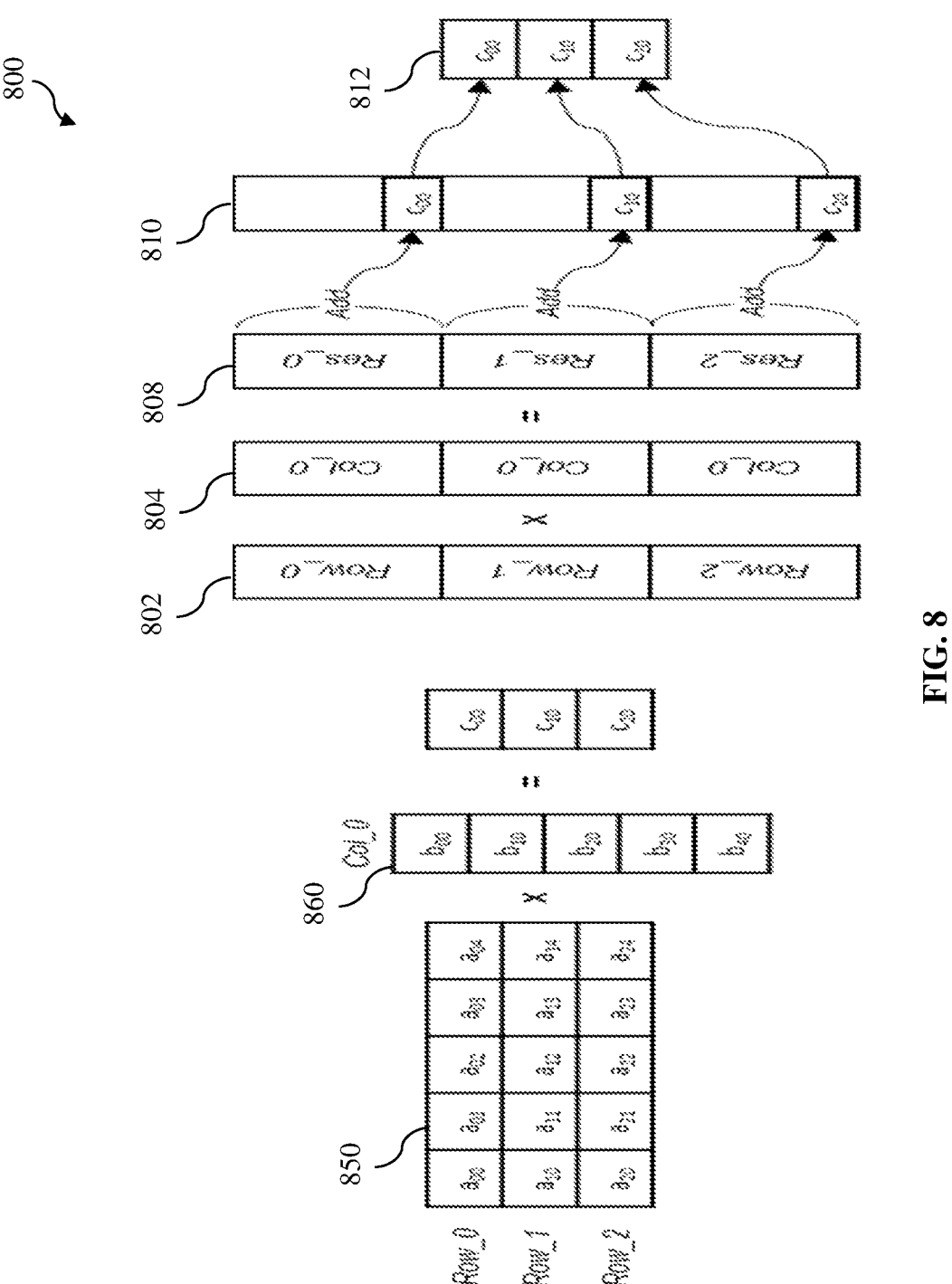
FIG. 8 depicts a schematic diagram illustrating an example homomorphic matrix-vector multiplication method, according to various example embodiment of the present invention, along with a corresponding matrix-vector multiplication method in plaintext for illustration purpose.

FIG. 8 depicts a schematic diagram illustrating an example homomorphic multiplication (matrix-vector multiplication) method 800 between a first ciphertext 802 and a second ciphertext 804, according to various example embodiment of the present invention. In various example embodiments, the first ciphertext 802 and the second ciphertext 804 are respectively a fully compactly packed matrix and fully compactly packed replicas of a vector. In this regard, as explained hereinbefore, the first ciphertext 802 comprises a plurality of vectors of slots (e.g., three vectors of slots, denoted by Row_0, Row_1 and Row_2, shown in FIG. 8) having packed therein a plurality of training samples, respectively, from a plurality of rows (e.g., three rows, denoted by Row_0, Row_1 and Row_2, shown in FIG. 8) of a matrix 850 of training samples in plaintext, and the second ciphertext 804 comprises a plurality of vectors of slots (e.g., three vectors of slots, each denoted by Col_0, shown in FIG. 8), each vector of slots having packed therein the same plurality of weights. Therefore, the first ciphertext 802 may be referred as a packed matrix (or more particularly, fully compactly packed matrix), but it can be appreciated by a person skilled in the art that the matrix is packed in the form of row-majored vectors sequentially in the first ciphertext 802. Based on the inter-slot summation method for any arbitrary number of ciphertext slots as described hereinbefore, the homomorphic matrix-vector multiplication method according to various example embodiments will now be further described below with reference to FIG. 8.

In various example embodiments, the operand matrix 850 may be fully compactly packed into the first ciphertext 802 in a row-by-row manner. That is, all of the row vectors of the matrix 850 is encrypted in the ciphertext 802 in sequence, without any padding space between the vectors. As a result, the number of ciphertexts created to encrypt the matrix 802 is minimized, and the memory resource requirement is also minimized. For example, a plurality of training samples may be comprised in a mini-batch of training samples, which is organised or formatted in the form of a matrix (e.g., matrix 850), whereby each row (or column) of the matrix 850 is a corresponding training sample of the plurality of training samples. Accordingly, each row of the matrix 850 of training data samples may be packed in sequence into a corresponding vector of slots of the first ciphertext 802. Furthermore, for each vector of slots of the first ciphertext 802 having packed therein a training sample, there is provided a corresponding vector of slots comprising a plurality of weights packed therein in the second ciphertext 804. In various example embodiments, as shown in FIG. 8, each training sample may comprise a plurality of data points (e.g., data points $a_{00}$ to $a_{04}$ for the first training sample (Row_0)), each data point of training sample being packed into a corresponding slot of the corresponding vector of slots of the first ciphertext 802. Similarly, the plurality of weights may comprise a plurality of data points, each data point (e.g., a corresponding weight) of the plurality of weights may be packed into a corresponding slot of the corresponding vector of slots of the second ciphertext 804. Accordingly, FIG. 8 illustrates an example homomorphic multiplication (matrix-vector multiplication) method 800 between a first ciphertext 802 and a second ciphertext 804, as well as a corresponding matrix-vector multiplication method in plaintext for illustration purpose only.

Accordingly, the operand column vector 860 may be replicated a number of times corresponding to (i.e., equals to) the number of rows in the operand matrix 850. These multiple replicas of the column vector 860 may be stacked together, encrypted and packed into another ciphertext (the second ciphertext 804). By way of example only and without limitation, one ciphertext (i.e., a single ciphertext) may have about 8,000 to 16,000 slots. Therefore, in practice or in most cases, there should be sufficient slots in the one ciphertext (e.g., the first ciphertext 802) for a matrix (e.g., the matrix 850) of training samples to be fully compactly packed in the one ciphertext.

In various example embodiments, a matrix-vector multiplication may be performed by computing the dot products of each row vector in the operand matrix 850 and the operand column vector 860. Accordingly, the homomorphic matrix-vector multiplication method according to various example embodiments may be performed by first multiplying the two ciphertexts 802, 804 that encrypt the matrix 850 and the vector replicas 860, respectively, followed by performing an inter-slot summation (which may also be referred to a partial sum) on each vector of slots in the resultant ciphertext 808. For example, as shown in FIG. 8, the resultant ciphertext 808 comprises three vectors of slots, denoted by Res_0, Res_1 and Res_2, corresponding to the three rows of the matrix 850 of training samples, respectively, and the inter-slot summation (denoted by "Add" in FIG. 8) is performed on each of the three vectors of slots of the resultant ciphertext 808, respectively. Thereafter, based on the inter-slot summation performed according to various example embodiments (e.g., as shown in FIG. 7), for each inter-slot summation performed on a vector of slots of the resultant ciphertext 808, the summation result (and hence the dot-product result) for that vector of slots may be produced in the last slot of the corresponding vector of slots in the ciphertext 810. The summation results may then be separately masked out, and arrange them consecutively (sequentially) in the ciphertext 812 configured to hold the dot product result of the homomorphic matrix-vector multiplication. Accordingly, as can be seen from FIG. 8, the inter-slot summation method according to various example embodiments may be utilized to compute the dot products concurrently for the row vectors 802 and the column vector 804.

Accordingly, the homomorphic matrix-vector multiplication method according to various example embodiments advantageously does not have any assumption or restriction that the matrix of training samples must be a square, or the vector size must be power-of-two. Therefore, the privacy-preserving logistic regression training can efficiently compute general matrix-vector multiplications during training without any restrictions on the matrix or vector sizes. In addition, the homomorphic matrix-vector multiplication method advantageously does not use zero-padding to pad the row vector size to be power-of-two when packing the matrix into the ciphertext. In contrast, the method compactly packs the rows of the matrix as vectors into a single ciphertext, thus requires no zero-padding, which advantageously maximizes the slots space utilization and eliminate any unnecessary computations.

Accordingly, the method of privacy-preserving logistic regression training based on homomorphically ciphertexts according to various example embodiments, whereby the inter-slot summation method according to various example embodiments is applied to homomorphic computations or operations (e.g., homomorphic matrix-vector multiplication) performed during training, advantageously improves computation efficiency and applicability (e.g., reducing or eliminating restrictions on matrix and/or vector sizes). For example, the method enables packing of more training samples in the ciphertext, and more parallelized computation.

By way of an example, if the feature dimension is n=40 for each training sample and each ciphertext has N=2048 slots, the number of training samples packed in a ciphertext, and the number of rotation operations to compute the dot-products are as shown in Table 1 below for different methods, namely, a first comparative method, a second comparison method and a present method according to various example embodiments of the present invention. The present method is the homomorphic matrix-vector multiplication method according to various example embodiments, including compact packing without zero-padding and the inter-slot summation according to various example embodiments. The first comparative method is a matrix-vector multiplication method including compact packing without zero-padding and the conventional inter-slot summation as described hereinbefore with reference to FIG. 6A. The second comparative method is a matrix-vector multiplication method including compact packing with zero-padding (such that each training sample is padded to the length of power-of-two and the conventional inter-slot summation as described hereinbefore with reference to FIG. 6B.

TABLE 1

Performance of various matrix-vector multiplication methods in terms of number of rotation operations in the inter-slot summation

|  | Number of training samples packed in a ciphertext | Number of rotation operations in the inter-slot sum |
|---|---|---|
| Present method | 51 | 6 |
| Comparative method 1 | 51 | 39 |
| Comparative method 2 | 32 | 6 |

Accordingly, it can be clearly observed that for the same number of training samples packed in a ciphertext, the computation efficiency associated with the present method is significantly improved, while also improving applicability (e.g., reducing or eliminating restrictions on matrix and/or vector sizes).

While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A method of privacy-preserving logistic regression training based on homomorphically encrypted ciphertexts, the method comprising:

obtaining a first packed ciphertext comprising at least a portion of a first training data sample packed into a first vector of slots thereof for training a privacy-preserving logistic regression model;

obtaining a second packed ciphertext comprising a plurality of weights of the privacy-preserving logistic regression model packed into a first vector of slots thereof;

determining at least a first output probability of the privacy-preserving logistic regression model based on the first packed ciphertext and the second packed ciphertext; and updating the plurality of weights based on the first output probability, wherein said determining at least the first output probability comprises performing a dot product between the first packed ciphertext and the second packed ciphertext, and said performing the dot product comprises:

multiplying the first vector of slots of the first packed ciphertext and the first vector of slots of the second packed ciphertext to obtain a plurality of first multiplication results in a first vector of slots of a first resultant ciphertext; and performing a first inter-slot summation of the first vector of slots of the first resultant ciphertext to obtain a first dot product result of the dot product between the first packed ciphertext and the second packed ciphertext, wherein said performing the first inter-slot summation comprises:

obtaining a first binary representation corresponding to the number of slots in the first vector of slots of the first resultant ciphertext;

for each digit in the first binary representation having a first binary value from the digit being the second most significant digit to the digital being the least significant digit amongst all digits in the first binary representation having the first binary value, generating a first new ciphertext based on rotating an immediately preceding ciphertext thereof by a number of slots based on a digit position of the digit in the first binary representation, and adding the first new ciphertext with a ciphertext having an index corresponding to said digit position to produce a second new ciphertext; and determining a summation of the first vector of slots of the first resultant ciphertext based on the second new ciphertext produced for said digit in the first binary representation having the first binary value and being the least significant digit, to produce the first dot product result.

2. The method according to claim 1, wherein the first binary value is binary value of 1.

3. The method according to claim 1, wherein the first new ciphertext is generated based on rotating the immediately preceding ciphertext thereof by the number of slots determined based on a power of two with an exponent thereof having a value corresponding to the digit position of the digit in the first binary representation.

4. The method according to claim 3, wherein said performing the first inter-slot summation further comprises: for each digit in the first binary representation from the digit being the least significant digit to the digit being the second most significant digit, generating a third new ciphertext based on rotating an immediately preceding ciphertext thereof by a number of slots based on a digit position of the digit in the first binary representation.

5. The method according to claim 4, wherein the third new ciphertext is generated based on rotating the immediately preceding ciphertext thereof by the number of slots determined based on a power of two with an exponent thereof having a value corresponding to the digit position of the digit in the first binary representation.

6. The method according to claim 5, wherein a plurality of new ciphertexts are generated, comprising the third new ciphertext for said each digit in the first binary representation from the digit being the least significant digit to the digit being the second most significant digit and the first and second new ciphertexts for said each digit in the first binary representation from the digit being the second most significant digit to the digital being the least significant digit, each of the plurality of new ciphertexts having an index corresponding to an order of the new ciphertext in the plurality of new ciphertexts.

7. The method according to claim 6, wherein said generating the first new ciphertext for the digit in the first binary representation being the second most significant digit is based on rotating the third new ciphertext generated for the digit in the first binary representation being the second most significant digit as the immediately preceding ciphertext thereof.

8. The method according to claim 1, wherein said determining the summation of the first vector of slots of the first resultant ciphertext comprises obtaining a summation result of the first vector of slots of the first resultant ciphertext from a predetermined slot of the second new ciphertext produced for said digit in the first binary representation having the first binary value and being the least significant digit.

9. The method according to claim 1, wherein the first packed ciphertext comprises a plurality of training data samples packed into a plurality of vectors of slots, respectively, thereof, for training the privacy-preserving logistic regression model, the plurality of training data samples comprising the first training data sample and one or more second training data samples, and the plurality of vectors of slots of the first packed ciphertext comprising the first vector of slots and one or more second vectors of slots of the first packed ciphertext, the second packed ciphertext comprises a plurality of vectors of slots, each vector of slots having packed therein the plurality of weights, the plurality of vectors of slots of the second packed ciphertext comprising the first vector of slots and one or more second vectors of slots of the second packed ciphertext, said determining at least the first output probability comprises determining a plurality of output probabilities of the privacy-preserving logistic regression model based on the first packed ciphertext and the second packed ciphertext, the plurality of output probabilities comprising the first output probability and one or more second output probabilities of the privacy-preserving logistic regression model, said updating the plurality of weights comprises updating the plurality of weights based on the plurality of output probabilities, said performing the dot product further comprises, for each second vector of slots of said one or more second vectors of slots of the first packed ciphertext:

multiplying the second vector of slots of the first packed ciphertext and the corresponding second vector of slots of the second packed ciphertext to obtain a plurality of second multiplication results in a second vector of slots of the first resultant ciphertext; and performing a second inter-slot summation of the second vector of slots of the first resultant ciphertext to obtain a second dot product result of the dot product between the first packed ciphertext and the second packed ciphertext, wherein said performing the second inter-slot summation comprises:

obtaining a second binary representation corresponding to the number of slots in the second vector of slots of the first resultant ciphertext;

for each digit in the second binary representation having the first binary value from the digit being the second most significant digit to the digital being the least significant digit amongst all digits in the second binary representation having the first binary value, generating a fourth new ciphertext based on rotating an immediately preceding ciphertext thereof by a number of slots based on a digit position of the digit in the second binary representation, and adding the fourth new ciphertext with a ciphertext having an index corresponding to said digit position to produce a fifth new ciphertext; and determining a summation of the second vector of slots of the first resultant ciphertext based on the fifth new ciphertext produced for said digit in the second binary representation having the first binary value and being the least significant digit, to produce the second dot product result.

10. The method according to claim 9, wherein said performing the first inter-slot summation of the first resultant ciphertext and said performing the second inter-slot summation of the first resultant ciphertext are performed in parallel.

11. The method according to claim 1, wherein said determining at least the first output probability further comprises applying an activation function on the first dot product result to produce the first output probability, the method further comprises:

determining a first loss gradient relating to the first training data sample based on the first output probability; and determining, for each of the plurality of weights, a second loss gradient relating to the weight based on the first loss gradient and a slot of the first vector of slots of the first packed ciphertext corresponding to the weight to obtain a plurality of second loss gradients relating to the plurality of weights, and said updating the plurality of weights comprises updating the plurality of weights based on the plurality of second loss gradients relating to the plurality of weights.

12. A system for privacy-preserving logistic regression training based on homomorphically encrypted ciphertexts, the system comprising:

a memory; and at least one processor communicatively coupled to the memory and configured to:

obtain a first packed ciphertext comprising at least a portion of a first training data sample packed into a first vector of slots thereof for training a privacy-preserving logistic regression model;

obtain a second packed ciphertext comprising a plurality of weights of the privacy-preserving logistic regression model packed into a first vector of slots thereof;

determine at least a first output probability of the privacy-preserving logistic regression model based on the first packed ciphertext and the second packed ciphertext; and update the plurality of weights based on the first output probability, wherein said determine at least the first output probability comprises performing a dot product between the first packed ciphertext and the second packed ciphertext, and said perform the dot product comprises:

multiplying the first vector of slots of the first packed ciphertext and the first vector of slots of slots of the second packed ciphertext to obtain a plurality of first multiplication results in a first vector of slots of a first resultant ciphertext; and performing a first inter-slot summation of the first vector of slots of the first resultant ciphertext to obtain a first dot product result of the dot product between the first packed ciphertext and the second packed ciphertext, wherein said performing the first inter-slot summation comprises:

obtaining a first binary representation corresponding to the number of slots in the first vector of slots of the first resultant ciphertext;

for each digit in the first binary representation having a first binary value from the digit being the second most significant digit to the digital being the least significant digit amongst all digits in the first binary representation having the first binary value, generating a first new ciphertext based on rotating an immediately preceding ciphertext thereof by a number of slots based on a digit position of the digit in the first binary representation, and adding the first new ciphertext with a ciphertext having an index corresponding to said digit position to produce a second new ciphertext; and determining a summation of the first vector of slots of the first resultant ciphertext based on the second new ciphertext produced for said digit in the first binary representation having the first binary value and being the least significant digit, to produce the first dot product result.

13. The system according to claim 12, wherein the first new ciphertext is generated based on rotating the immediately preceding ciphertext thereof by the number of slots determined based on a power of two with an exponent thereof having a value corresponding to the digit position of the digit in the first binary representation.

14. The system according to claim 13, wherein said performing the first inter-slot summation further comprises: for each digit in the first binary representation from the digit being the least significant digit to the digit being the second most significant digit, generating a third new ciphertext based on rotating an immediately preceding ciphertext thereof by a number of slots based on a digit position of the digit in the first binary representation.

15. The system according to claim 14, wherein the third new ciphertext is generated based on rotating the immediately preceding ciphertext by the number of slots determined based on a power of two with an exponent thereof having a value corresponding to the digit position of the digit in the first binary representation.

16. The system according to claim 15, wherein a plurality of new ciphertexts are generated, comprising the third new ciphertext for said each digit in the first binary representation from the digit being the least significant digit to the digit being the second most significant digit and the first and second new ciphertexts for said each digit in the first binary representation from the digit being the second most significant digit to the digital being the least significant digit, each of the plurality of new ciphertexts having an index corresponding to an order of the new ciphertext in the plurality of new ciphertexts.

17. The system according to claim 16, wherein said generating the first new ciphertext for the digit in the first binary representation being the second most significant digit is based on rotating the third new ciphertext generated for the digit in the first binary representation being the second most significant digit as the immediately preceding ciphertext thereof.

18. The system according to claim 12, wherein the first packed ciphertext comprises a plurality of training data samples packed into a plurality of vectors of slots, respectively, thereof, for training the privacy-preserving logistic regression model, the plurality of training data samples comprising the first training data sample and one or more second training data samples, and the plurality of vectors of slots of the first packed ciphertext comprising the first vector of slots and one or more second vectors of slots of the first packed ciphertext, the second packed ciphertext comprises a plurality of vectors of slots, each vector of slots having packed therein the plurality of weights, the plurality of vectors of slots of the second packed ciphertext comprising the first vector of slots and one or more second vectors of slots of the second packed ciphertext, said determine at least the first output probability comprises determining a plurality of output probabilities of the privacy-preserving logistic regression model based on the first packed ciphertext and the second packed ciphertext, the plurality of output probabilities comprising the first output probability and one or more second output probabilities of the privacy-preserving logistic regression model, said update the plurality of weights comprises updating the plurality of weights based on the plurality of output probabilities, said performing the dot product further comprises, for each second vector of slots of said one or more second vectors of slots of the plurality of slots of the first packed ciphertext:

multiplying the second vector of slots of the first packed ciphertext and the corresponding second vector of slots of the second packed ciphertext to obtain a plurality of second multiplication results in a second vector of slots of the first resultant ciphertext; and performing a second inter-slot summation of the second vector of slots of the first resultant ciphertext to obtain a second dot product result of the dot product between the first packed ciphertext and the second packed ciphertext, wherein said performing the second inter-slot summation comprises:

obtaining a second binary representation corresponding to the number of slots in the second vector of slots of the first resultant ciphertext;

for each digit in the second binary representation having the first binary value from the digit being the second most significant digit to the digital being the least significant digit amongst all digits in the second binary representation having the first binary value, generating a fourth new ciphertext based on rotating an immediately preceding ciphertext thereof by a number of slots based on a digit position of the digit in the second binary representation, and adding the fourth new ciphertext with a ciphertext having an index corresponding to said digit position to produce a fifth new ciphertext; and determining a summation of the second vector of slots of the first resultant ciphertext based on the fifth new ciphertext produced for said digit in the second binary representation having the first binary value and being the least significant digit, to produce the second dot product result.

19. The system according to claim 12, wherein said determine at least the first output probability further comprises applying an activation function on the first dot product result to produce the first output probability, the method further comprises:

determining a first loss gradient relating to the first training data sample based on the first output probability; and determining, for each of the plurality of weights, a second loss gradient relating to the weight based on the first loss gradient and a slot of the first vector of slots of the first packed ciphertext corresponding to the weight to obtain a plurality of second loss gradients relating to the plurality of weights, and said update the plurality of weights comprises updating the plurality of weights based on the plurality of second loss gradients relating to the plurality of weights.

20. A computer program product, embodied in one or more non-transitory computer-readable storage mediums, comprising instructions executable by at least one processor to perform a method of privacy-preserving logistic regression training based on homomorphically encrypted ciphertexts, the method comprising:

obtaining a first packed ciphertext comprising at least a portion of a first training data sample packed into a first vector of slots thereof for training a privacy-preserving logistic regression model;

obtaining a second packed ciphertext comprising a plurality of weights of the privacy-preserving logistic regression model packed into a first vector of slots thereof;

determining at least a first output probability of the privacy-preserving logistic regression model based on the first packed ciphertext and the second packed ciphertext; and updating the plurality of weights based on the first output probability, wherein said determining at least the first output probability comprises performing a dot product between the first packed ciphertext and the second packed ciphertext, and said performing the dot product comprises:

multiplying the first vector of slots of the first packed ciphertext and the first vector of slots of the second packed ciphertext to obtain a plurality of first multiplication results in a first vector of slots of a first resultant ciphertext; and performing a first inter-slot summation of the first vector of slots of the first resultant ciphertext to obtain a first dot product result of the dot product between the first packed ciphertext and the second packed ciphertext, wherein said performing the first inter-slot summation comprises:

obtaining a first binary representation corresponding to the number of slots in the first vector of slots of the first resultant ciphertext;

for each digit in the first binary representation having a first binary value from the digit being the second most significant digit to the digital being the least significant digit amongst all digits in the first binary representation having the first binary value, generating a first new ciphertext based on rotating an immediately preceding ciphertext thereof by a number of slots based on a digit position of the digit in the first binary representation, and adding the first new ciphertext with a ciphertext having an index corresponding to said digit position to produce a second new ciphertext; and determining a summation of the first vector of slots of the first resultant ciphertext based on the second new ciphertext produced for said digit in the first binary representation having the first binary value and being the least significant digit, to produce the first dot product result.

* * * * *